United States Patent
He

(10) Patent No.: US 8,543,164 B2
(45) Date of Patent: Sep. 24, 2013

(54) SLEEP METHOD, WAKE METHOD AND MOBILE TERMINAL DEVICE

(71) Applicant: Huawei Device Co., Ltd., Guangdong (CN)

(72) Inventor: Miao He, Wuhan (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/622,677

(22) Filed: Sep. 19, 2012

(65) Prior Publication Data
US 2013/0225238 A1 Aug. 29, 2013

(30) Foreign Application Priority Data

Feb. 25, 2012 (CN) .......................... 2012 1 0045673

(51) Int. Cl.
| H04B 1/38 | (2006.01) |
| H04B 1/00 | (2006.01) |
| G06F 1/00 | (2006.01) |
| H02J 7/00 | (2006.01) |

(52) U.S. Cl.
USPC ........... 455/558; 455/574; 713/323; 713/300; 320/108; 320/128; 719/318

(58) Field of Classification Search
USPC ......... 455/558, 574; 713/323, 300; 320/108, 320/128; 345/163; 719/318; 370/352
See application file for complete search history.

(56) References Cited

U.S. PATENT DOCUMENTS

| 6,240,521 B1 * | 5/2001 | Barber et al. ................. 713/323 |
| 2005/0239518 A1 * | 10/2005 | D'Agostino et al. ......... 455/574 |
| 2006/0184809 A1 * | 8/2006 | Kojou et al. .................. 713/300 |
| 2006/0212727 A1 | 9/2006 | Judge et al. |
| 2009/0037756 A1 * | 2/2009 | Lundquist et al. ............ 713/323 |
| 2009/0058361 A1 * | 3/2009 | John .............................. 320/128 |
| 2009/0059899 A1 * | 3/2009 | Bendelac ...................... 370/352 |
| 2009/0158063 A1 * | 6/2009 | Wang et al. ................... 713/300 |
| 2009/0203363 A1 | 8/2009 | Isobe |
| 2009/0298555 A1 * | 12/2009 | Matson et al. ................ 455/574 |

(Continued)

FOREIGN PATENT DOCUMENTS

| CN | 101005658 A | 7/2007 |
| CN | 101778457 A | 7/2010 |

(Continued)

OTHER PUBLICATIONS

International Search Report and Written Opinion of the International Searching Authority in corresponding International Patent Application No. PCT/CN2013/071611 (Feb. 17, 2013).
Extended European Search Report in corresponding European Patent Application No. 12185843.5 (Mar. 11, 2013).

*Primary Examiner* — Jinsong Hu
*Assistant Examiner* — Jean Chang
(74) *Attorney, Agent, or Firm* — Leydig, Voit & Mayer, Ltd.

(57) ABSTRACT

The present invention discloses a sleep method, including: when determining select a sleep mode of a mobile terminal device, recording, by the mobile terminal device, service state information related to data connection; according to the recorded service state information related to the data connection, turning off a service that is related to the data connection and is in a turn-on state; and controlling a processor to enter a sleep mode, thereby saving the power consumption of the mobile terminal device more than that in the prior art.

23 Claims, 10 Drawing Sheets

(56) References Cited

U.S. PATENT DOCUMENTS

2009/0307715 A1* 12/2009 Santamaria et al. .......... 719/318
2011/0021254 A1* 1/2011 Fyke .............................. 455/574
2012/0162077 A1* 6/2012 Sze et al. ....................... 345/163
2012/0206096 A1* 8/2012 John .............................. 320/108
2012/0246686 A1 9/2012 Dong

FOREIGN PATENT DOCUMENTS

| | | |
|---|---|---|
| CN | 101969502 A | 2/2011 |
| CN | 102622079 A | 8/2012 |
| WO | WO 2010149063 A1 | 12/2010 |

* cited by examiner

SLEEP METHOD, WAKE METHOD AND MOBILE TERMINAL DEVICE

CROSS-REFERENCE TO RELATED APPLICATION

This application claims priority to Chinese Patent Application No. 201210045673.X, filed on Feb. 25, 2012, which is hereby incorporated by reference in its entirety.

FIELD OF THE INVENTION

The present invention relates to the field of communication technologies, and in particular, to a sleep method, a wake method and a mobile terminal device.

BACKGROUND OF THE INVENTION

As mobile terminal devices, such as smart mobile phones and tablet computers, become more and more popular among vast users, the user experience is increasingly drawing attention to the users for the use of time length of this type of terminal device.

In the conventional art, the touch screen of the mobile terminal device consumes a very large part of energy, so when a user does not need to use the mobile terminal device, the user turns off the touch screen of the mobile terminal device usually by using a standby function, so that the mobile terminal device is in an off-screen standby state; when the user needs to use the mobile terminal device, the user then enables the touch screen of the mobile terminal device in a standby state to begin to work normally through a wake function, so as to save the power consumption of the mobile terminal device and achieve the objective of prolonging the use time of the mobile terminal device.

However, in the conventional standby solution, when a mobile terminal device is in a standby state, although the touch screen of the mobile terminal device is turned off, the mobile terminal device is still in the working state and still consumes the energy of the mobile terminal device to a very large extent, therefore it is impossible to achieve the prolonging of the use time of the mobile terminal device in high efficiency.

To overcome the defect, the user may solve the problem through a method in which the mobile terminal device is turned off through a temporary power-off manner, and when the user needs to use the mobile terminal device, the user then enables the mobile terminal device to begin to work normally through the startup again. However, in the startup procedure of the mobile terminal device, which usually takes a pre-set time period expired, the mobile terminal device cannot gradually enter the system until the system is initialized and various system programs are loaded If the user urgently needs to use the mobile terminal device, and the conventional startup procedure makes the user wait for a very long time, the user experience will be negatively influenced, and thereby deteriorated.

SUMMARY OF THE INVENTION

The objective of embodiments of the present invention is to provide a sleep method, a wake method and a mobile terminal device, so as to prolong the use time of the mobile terminal device in high efficiency.

A sleep method includes:
when determining to select a sleep mode of a mobile terminal device, recording, by the mobile terminal device, service state information related to data connection;
according to the recorded service state information related to the data connection, turning off a service that is related to the data connection and is in a turn-on state; and
controlling a processor to enter a sleep mode.

A wake method includes:
when determining that a mobile terminal device needs to be waked, waking a processor that has entered a sleep mode; and
restoring a service that is related to data connection and is in a turn-on state and is turned off in the sleep mode, so that the mobile terminal device enters a system.

A mobile terminal device applied to sleep includes:
a recording unit, configured to, when determining to select a sleep mode of a mobile terminal device, record service state information related to data connection;
a turn-off unit, configured to, according to the recorded service state information related to the data connection, turn off a service that is related to the data connection and is in a turn-on state; and
a control unit, configured to control a processor to enter a sleep mode.

A mobile terminal device applied to wake includes:
a wake unit, configured to, when determining that a mobile terminal device needs to be waked, wake a processor that has entered a sleep mode; and
a restoring unit, configured to restore a service that is related to data connection and is in a turn-on state and is turned off in the sleep mode, so that the mobile terminal device enters a system.

DETAILED DESCRIPTION OF THE EMBODIMENTS

The technical solutions of the embodiments of the present invention are hereinafter described clearly and completely with reference to the accompanying drawings in the embodiments of the present invention. Evidently, the described embodiments are only some exemplary embodiments of the present invention, rather than all embodiments of the present invention. All other embodiments obtained by persons of ordinary skill in the art based on the embodiments of the present invention without creative efforts shall fall within the protection scope of the present invention.

In this embodiment, when a user does not need to use a mobile terminal device, the user may enable the current mobile terminal device to enter a sleep mode through manual selection or system setting, and may also enable the current mobile terminal device to enter the sleep mode through an automatic system selection standby function of the mobile terminal device; and when the user needs to use the mobile terminal device, the current mobile terminal device is waked through a user operation, and the current mobile terminal device may also be waked through an automatic system selection wake function of the mobile terminal device. In this embodiment, the mobile terminal device may refer to a smart mobile phone or tablet computer.

In this embodiment, the sleep mode refers to that the mobile terminal device is powered off in a faking manner, but is not truly powered off, and may also be referred to as a standby mode. Illustration is provided below.

Figure 1:
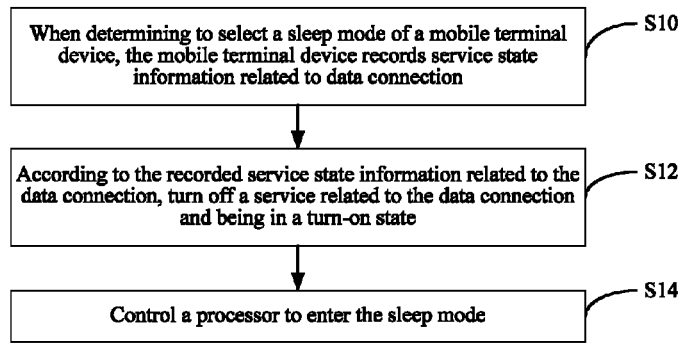
FIG. 1 is a flowchart of a sleep method according to Embodiment 1 of the present invention.
Figure 2:
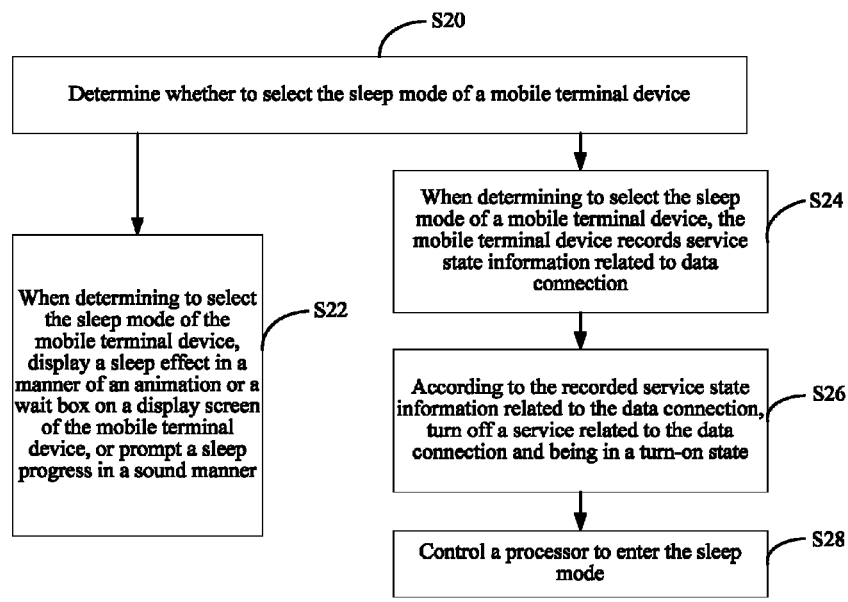
FIG. 2 is a flowchart of a sleep method according to Embodiment 2 of the present invention.

As shown in FIG. 1, FIG. 1 is a flowchart of a sleep method according to Embodiment 1 of the present invention.

In this embodiment, step S10: when determining to select a sleep mode of a mobile terminal device, record, by the mobile terminal device, service state information related to data connection. In this embodiment, the service related to the data connection includes GPS, WIFI, and Bluetooth. In this embodiment, when the mobile terminal device is normally used, the service may have a current use state, so when the mobile terminal device enters sleep, the mobile terminal device records current information of a turn-on state and a turn-off state of the service, and the recorded state information is to be subsequently used to wake the mobile terminal device.

In this embodiment, whether to select the sleep mode of the mobile terminal device may be determined in a user manual selection manner or an automatic system selection manner. Separate descriptions are made below.

First case: when whether to select the sleep mode of the mobile terminal device is determined in a user manual selection manner, the following may be included.

When the mobile terminal device detects that a user presses a power key on the mobile terminal device manually for a pre-set time period expired, the mobile terminal device prompts whether the user selects to enter a sleep mode or enter a power-off mode through a selection box.

When the user selects the sleep mode, the mobile terminal device begins step S10.

When the user selects the power-off mode, the mobile terminal device executes a normal power-off procedure, that is, it is powered off.

The mobile terminal device may provide an application for selecting sleep to be selected by the user manually, this application for selecting sleep may be displayed on a touch screen of the mobile terminal device, and when whether to select the sleep of the mobile terminal device is determined in the user manual selection manner, the following may be further included.

The mobile terminal device detects whether the user triggers the application for selecting sleep.

When the mobile terminal device detects that the user triggers the application for selecting sleep, the mobile terminal device begins step S10.

When whether to select the sleep mode of the mobile terminal device is determined in the user manual selection manner, the following may be further included. The mobile terminal device provides a selection box for selecting to enter the sleep mode in a system setting interface, so as to be selected by the user.

When the mobile terminal device detects that a user presses a power key on the mobile terminal device manually for a pre-set time period expired, whether the selection box of the sleep mode in the system setting interface is selected is determined.

If it is determined that the selection box of the sleep mode in the system setting interface is selected, that is, it is determined that the user selects the sleep mode, the mobile terminal device begins step S10.

If it is determined that the selection box of the sleep mode in the system setting interface is not selected, that is, it is determined that the user does not select the sleep mode, the mobile terminal device executes a normal power-off procedure, that is, it is powered off.

Alternatively, when it is determined that the selection box of the sleep mode in the system setting interface is not selected, the mobile terminal device may further prompt whether the user selects to enter a sleep mode or enter a power-off mode through a selection box.

Second case: when whether to select the sleep mode of the mobile terminal device is determined in an automatic system selection manner, the following may be included.

When the mobile terminal device detects that a user selects power-off, the mobile terminal device detects whether the mobile terminal device is currently in a charging state, or whether a high definition multimedia interface (High Definition Multimedia Interface, HDMI) is inserted with an HDMI line.

When the mobile terminal device detects that the mobile terminal device is currently in the charging state or the HDMI is inserted with the HDMI line, the mobile terminal device performs a normal power-off procedure.

When the mobile terminal device detects that the mobile terminal device is not in the charging state currently or the HDMI is not inserted with the HDMI line, the mobile terminal device automatically selects the sleep mode in place of power-off, and begins to execute step S10.

When a power interface and a USB interface on the mobile terminal device are different, and when whether to select the sleep mode of the mobile terminal device is determined in the automatic system selection manner, the following may be further included.

The mobile terminal device detects whether an event that the power interface is inserted with a power line occurs.

When the mobile terminal device detects that the event that the power interface is inserted with the power line occurs, the mobile terminal device automatically selects the sleep mode in place of power-off, and begins to execute step S10.

Definitely, when the power interface and the USB interface on the mobile terminal device are the same, and when the mobile terminal device detects that the event that the USB interface is inserted with a USB line occurs, the mobile terminal device performs a normal power-off procedure.

Step S12: according to the recorded service state information related to the data connection, turn off a service that is related to the data connection and is in a turn-on state. In this embodiment, the turning off the service that is related to the data connection and is turned on includes turning on an offline mode and turning off GPS.

Step S14: control a processor to enter a sleep mode. In this embodiment, when the processor is controlled to enter the sleep mode, the processor does not process communication and application services again. In this embodiment, the processor may be controlled to enter the sleep mode by setting the current running state of the processor to a sleep state.

In this embodiment, the processor may include multiple models of processors, such as a single-core processor, a dual-core processor, and a quad-core processor. In this embodiment, when the processor is a single-core processor, because a communication service and an application service are processed by one processor, the single-core processor is directly controlled to enter the sleep mode; when the processor is a dual-core processor, it is required to control a processor for processing a communication service and a processor for processing an application service to enter the sleep mode; when the processor is a quad-core processor, it is required to control a processor for processing a communication service and a processor for processing an application service to enter the sleep mode. The rest may be deduced by analogy. When the processor is a multi-core processor, it is required to control a processor for processing a communication service and a processor for processing an application service to enter the sleep mode.

In this embodiment, after the application service of the processor enters the sleep mode, the mobile terminal device turns off its screen, that is, it indicates that the mobile terminal device has entered the sleep mode.

In the sleep method provided in the embodiment of the present invention, by turning off the service that is related to the data connection and is turned on, and controlling the processor to enter the sleep mode, the service related to the data connection and the use of the processor may be turned off, and the power consumption of the mobile terminal device in a standby state may be reduced. Compared with the prior art, more services and apparatuses consuming energy are turned off, and the power consumption of the mobile terminal device is saved more than that in the prior art, so the use time of the mobile terminal device is prolonged more, and a user does not need to select a power-off manner to save the power consumption of the mobile terminal device.

In this embodiment, alternatively, on the basis of Embodiment 1, an additional operation may be added optionally. For example, when it is determined to select the sleep mode of the mobile terminal device, a sleep effect through an animation or a wait box is displayed on the display screen of the mobile terminal device, or a sleep progress is prompted through a sound. Definitely, the operation may be performed together with other steps simultaneously. In this embodiment, the user is prompted in a manner that a sleep effect is displayed through an animation or a wait box on the display screen of the mobile terminal device or a sleep progress is prompted through a sound, so as to achieve improvement of user experience.

Alternatively, after the service that is related to the data connection and is in a turn-on state is turned off, a non-core process may be killed or turned off. In this embodiment, core processes include a core process, a phone process, a SYSTEM_UID process, and an android.process.media process. In this embodiment, killing or turning off a non-core process refers to killing or turning off a process except the core processes. In this embodiment, because the non-core process is killed or turned off, the energy consumption of the mobile terminal device may be further reduced.

The sleep method of Embodiment 1 in combination with the alternative operation is described below.

In this embodiment, step S20: determine whether to select a sleep mode of a mobile terminal device.

In this embodiment, whether to select the sleep mode of the mobile terminal device may be determined in a user manual selection manner or an automatic system selection manner. Separate descriptions are made below.

First case: when whether to select the sleep mode of the mobile terminal device is determined in a user manual selection manner, the following may be included.

When the mobile terminal device detects that a user presses a power key on the mobile terminal device manually for a pre-set time period expired, the mobile terminal device prompts whether the user selects to enter a sleep mode or enter a power-off mode through a selection box.

When the user selects the sleep mode, the mobile terminal device begins steps S22 and S24.

When the user selects the power-off mode, the mobile terminal device executes a normal power-off procedure, that is, it is powered off.

The mobile terminal device may provide an application for selecting sleep to be selected by the user manually, this application for selecting sleep may be displayed on a touch screen of the mobile terminal device, and when whether to select the sleep mode of the mobile terminal device is determined in the user manual selection manner, the following may be further included.

The mobile terminal device detects whether the user triggers the application for selecting sleep.

When the mobile terminal device detects that the user triggers the application for selecting sleep, the mobile terminal device begins steps S22 and S24.

When whether to select the sleep mode of the mobile terminal device is determined in the user manual selection manner, the following may be further included. The mobile terminal device provides a selection box for selecting to enter the sleep mode in a system setting interface, so as to be selected by the user.

When the mobile terminal device detects that a user presses a power key on the mobile terminal device manually for a pre-set time period expired, whether the selection box of the sleep mode in the system setting interface is selected is determined.

If it is determined that the selection box of the sleep mode in the system setting interface is selected, that is, it is determined that the user selects the sleep mode, the mobile terminal device begins steps S22 and S24.

If it is determined that the selection box of the sleep mode in the system setting interface is not selected, that is, it is determined that the user does not select the sleep mode, the mobile terminal device executes a normal power-off procedure, that is, it is powered off.

Alternatively, when it is determined that the selection box of the sleep mode in the system setting interface is not selected, the mobile terminal device may further prompt whether the user selects to enter the sleep mode or enter the power-off mode through a selection box.

Second case: when whether to select the sleep mode of the mobile terminal device is determined in an automatic system selection manner, the following may be included.

When the mobile terminal device detects that a user selects power-off, the mobile terminal device detects whether the mobile terminal device is currently in a charging state, or whether a high definition multimedia interface (High Definition Multimedia Interface, HDMI) is inserted with an HDMI line.

When the mobile terminal device detects that the mobile terminal device is currently in the charging state or the HDMI is inserted with the HDMI line, the mobile terminal device performs a normal power-off procedure.

When the mobile terminal device detects that the mobile terminal device is not in the charging state currently or the HDMI is not inserted with the HDMI line, the mobile terminal device automatically selects the sleep mode in place of power-off, and the mobile terminal device begins steps S22 and S24.

When a power interface and a USB interface on the mobile terminal device are different, and when whether to select the sleep mode of the mobile terminal device is determined in the automatic system selection manner, the following may be further included.

The mobile terminal device detects whether an event that the power interface is inserted with a power line occurs.

When the mobile terminal device detects that the event that the power interface is inserted with the power line occurs, the mobile terminal device automatically selects the sleep mode in place of power-off, and begins to execute steps S22 and S24.

Definitely, when the power interface and the USB interface on the mobile terminal device are the same, and when the mobile terminal device detects that the event that the USB interface is inserted with a USB line occurs, the mobile terminal device performs a normal power-off procedure.

Step S22: when determining to select the sleep mode of the mobile terminal device, display a sleep effect in a manner of an animation or a wait box on a display screen of the mobile terminal device, or prompt a sleep progress in a sound manner While step S22 is being executed, the following steps may be synchronously executed.

Step S24: when it is determined to select a sleep mode of a mobile terminal device, the mobile terminal device records service state information related to data connection. In this embodiment, the service related to the data connection includes GPS, WIFI, and Bluetooth. In this embodiment, when the mobile terminal device is normally used, the service may have a current use state, so when the mobile terminal device enters sleep, the mobile terminal device records information of a current use state of the service, and the recorded state information is to be subsequently used to wake the mobile terminal device.

Step S26: turn off the service that is related to the data connection and is in a turn-on state. In this embodiment, the turning off the service that is related to the data connection and is turned on includes turning on an offline mode and turning off GPS.

Step S28: control a processor to enter a sleep mode. In this embodiment, when the processor is controlled to enter the sleep mode, the processor does not process communication and application services again. In this embodiment, the processor may be controlled to enter the sleep mode by setting the current running state of the processor to a sleep state.

In this embodiment, the processor may include multiple models of processors, such as a single-core processor, a dual-core processor, and a quad-core processor. In this embodiment, when the processor is a single-core processor, because a communication service and an application service are processed by one processor, the single-core processor is directly controlled to enter the sleep mode; when the processor is a dual-core processor, it is required to control a processor for processing a communication service and a processor for processing an application service to enter the sleep mode; when the processor is a quad-core processor, it is required to control a processor for processing a communication service and a processor for processing an application service to enter the sleep mode. The rest may be deduced by analogy. When the processor is a multi-core processor, it is required to control a processor for processing a communication service and a processor for processing an application service to enter the sleep mode.

After the processor enters the sleep mode, step S22 may end, so as to indicate that the mobile terminal device has entered the sleep mode currently.

In the sleep method provided in the embodiment of the present invention, by turning off the service that is related to the data connection and is turned on, and controlling the processor to enter the sleep mode, the service related to the data connection and the use of the processor may be turned off, and the power consumption of the mobile terminal device in a standby state may be reduced. Compared with the prior art, more services and apparatuses consuming energy are turned off, and the power consumption of the mobile terminal device is saved more than that in the prior art, so the use time of the mobile terminal device is prolonged more.

Figure 3:
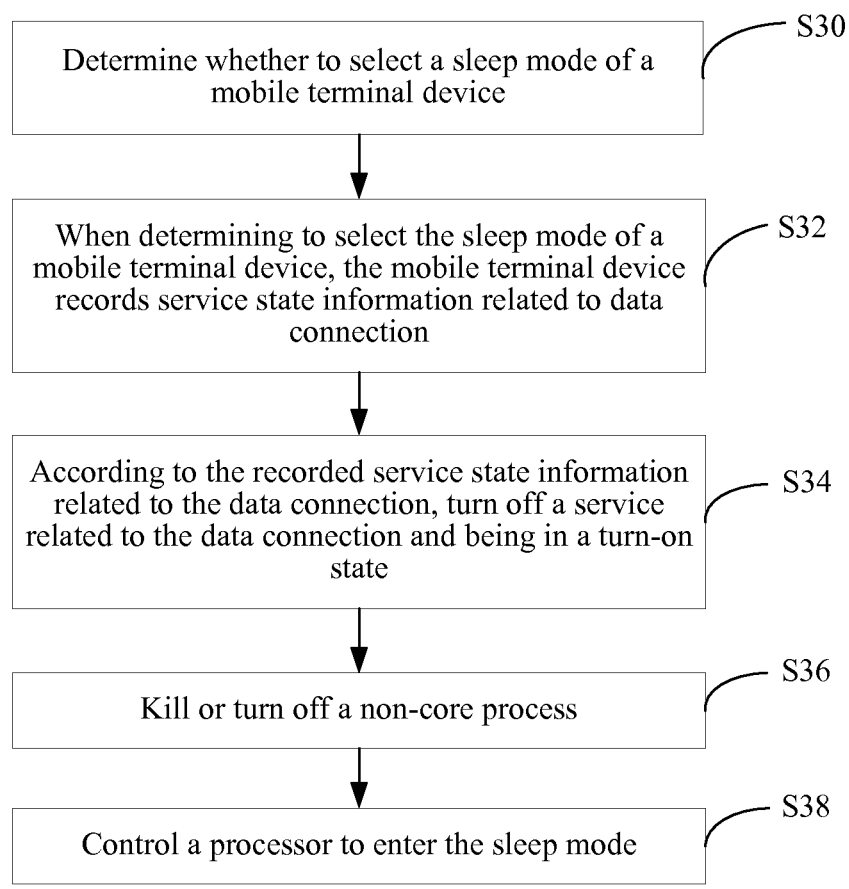
FIG. 3 is a flowchart of a sleep method according to Embodiment 3 of the present invention.

FIG. 3 is a flowchart of a sleep method according to Embodiment 3 of the present invention.

In this embodiment, step S30: determine whether to select a sleep mode of a mobile terminal device.

In this embodiment, whether to select the sleep mode of the mobile terminal device may be determined in a user manual selection manner or an automatic system selection manner. Separate descriptions are made below.

First case: when whether to select the sleep mode of the mobile terminal device is determined in a user manual selection manner, the following may be included.

When the mobile terminal device detects that a user presses a power key on the mobile terminal device manually for a pre-set time period expired, the mobile terminal device prompts whether the user selects to enter a sleep mode or enter a power-off mode through a selection box.

When the user selects the sleep mode, the mobile terminal device begins step S32.

When the user selects the power-off mode, the mobile terminal device executes a normal power-off procedure, that is, it is powered off.

The mobile terminal device may provide an application for selecting sleep to be selected by the user manually, this application for selecting sleep may be displayed on a touch screen of the mobile terminal device, and when whether to select the sleep mode of the mobile terminal device is determined in the user manual selection manner, the following may be further included.

The mobile terminal device detects whether the user triggers the application for selecting sleep.

When the mobile terminal device detects that the user triggers the application for selecting sleep, the mobile terminal device begins step S32.

When whether to select the sleep mode of the mobile terminal device is determined in the user manual selection manner, the following may be further included. The mobile terminal device provides a selection box for selecting to enter the sleep mode in a system setting interface, so as to be selected by the user.

When the mobile terminal device detects that a user presses a power key on the mobile terminal device manually for a pre-set time period expired, whether the selection box of the sleep mode in the system setting interface is selected is determined.

If it is determined that the selection box of the sleep mode in the system setting interface is selected, that is, it is determined that the user selects the sleep mode, the mobile terminal device begins step S32.

If it is determined that the selection box of the sleep mode in the system setting interface is not selected, that is, it is determined that the user does not select the sleep mode, the mobile terminal device executes a normal power-off procedure, that is, it is powered off.

Alternatively, when it is determined that the selection box of the sleep mode in the system setting interface is not selected, the mobile terminal device may further prompt whether the user selects to enter the sleep mode or enter the power-off mode through a selection box.

Second case: when whether to select the sleep mode of the mobile terminal device is determined in an automatic system selection manner, the following may be included.

When the mobile terminal device detects that a user selects power-off, the mobile terminal device detects whether the mobile terminal device is currently in a charging state, or whether a high definition multimedia interface (High Definition Multimedia Interface, HDMI) is inserted with an HDMI line.

When the mobile terminal device detects that the mobile terminal device is currently in the charging state or the HDMI is inserted with the HDMI line, the mobile terminal device performs a normal power-off procedure.

When the mobile terminal device detects that the mobile terminal device is not in the charging state currently or the HDMI is not inserted with the HDMI line, the mobile terminal device automatically selects the sleep mode in place of power-off, and the mobile terminal device begins step S32.

When a power interface and a USB interface on the mobile terminal device are different, and when whether to select the sleep mode of the mobile terminal device is determined in the automatic system selection manner, the following may be further included.

The mobile terminal device detects whether an event that the power interface is inserted with a power line occurs.

When the mobile terminal device detects that the event that the power interface is inserted with the power line occurs, the mobile terminal device automatically selects the sleep mode in place of power-off, and begins to execute step S32.

Definitely, when the power interface and the USB interface on the mobile terminal device are the same, and when the mobile terminal device detects that the event that the USB interface is inserted with a USB line occurs, the mobile terminal device performs a normal power-off procedure.

Step S32: when it is determined to select a sleep mode of a mobile terminal device, the mobile terminal device records service state information related to data connection. In this embodiment, the service related to the data connection includes GPS, WIFI, and Bluetooth. In this embodiment, when the mobile terminal device is normally used, the service may have a current use state, so when the mobile terminal device enters sleep, the mobile terminal device records information of a current use state of the service, and the recorded state information is to be subsequently used to wake the mobile terminal device.

Step S34: turn off the service that is related to the data connection and is in a turn-on state. In this embodiment, the turning off the service that is related to the data connection and is turned on includes turning on an offline mode and turning off GPS.

Step S36: kill or turn off a non-core process. In this embodiment, core processes include a core process, a phone process, a SYSTEM_UID process, and an android.process.media process. In this embodiment, killing or turning off a non-core process refers to killing or turning off a process except the core processes.

Step S38: control a processor to enter a sleep mode. In this embodiment, when the processor is controlled to enter the sleep mode, the processor does not process communication and application services again. In this embodiment, the processor may be controlled to enter the sleep mode by setting the current running state of the processor to a sleep state.

In this embodiment, the processor may include multiple models of processors, such as a single-core processor, a dual-core processor, and a quad-core processor. In this embodiment, when the processor is a single-core processor, because a communication service and an application service are processed by one processor, the single-core processor is directly controlled to enter the sleep mode; when the processor is a dual-core processor, it is required to control a processor for processing a communication service and a processor for processing an application service to enter the sleep mode; when the processor is a quad-core processor, it is required to control a processor for processing a communication service and a processor for processing an application service to enter the sleep mode. The rest may be deduced by analogy. When the processor is a multi-core processor, it is required to control a processor for processing a communication service and a processor for processing an application service to enter the sleep mode.

In this embodiment, after the application service of the processor enters the sleep mode, the mobile terminal device turns off its screen, that is, it indicates that the mobile terminal device has entered the sleep mode.

In the sleep method provided in the embodiment of the present invention, by turning off the service that is related to the data connection and is turned on, and controlling the processor to enter the sleep mode, the service related to the data connection and the use of the processor may be turned off, and the power consumption of the mobile terminal device in a standby state may be reduced. Compared with the prior art, more services and apparatuses consuming energy are turned off, and the power consumption of the mobile terminal device is saved more than that in the prior art, so the use time of the mobile terminal device is prolonged more. Furthermore, on the basis of Embodiment 1, because the non-core process is killed or turned off, the energy consumption of the mobile terminal device may be further reduced.

Figure 4:
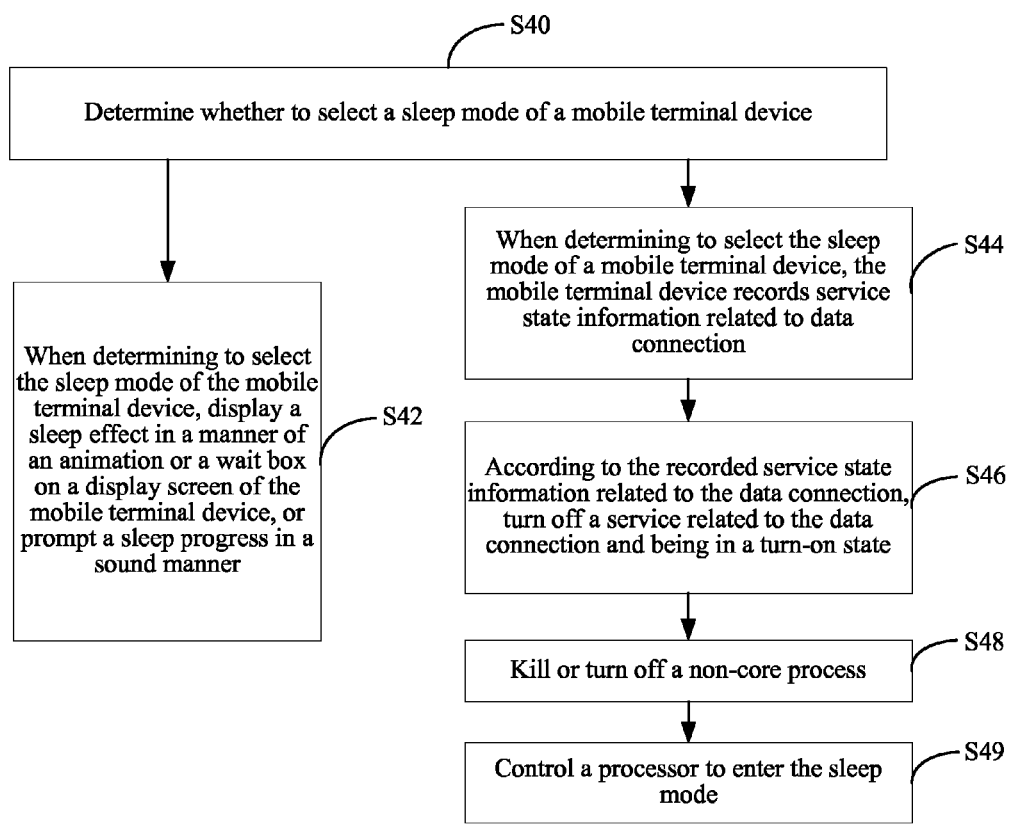
FIG. 4 is a flowchart of a sleep method according to Embodiment 4 of the present invention.

FIG. 4 is a flowchart of a sleep method according to Embodiment 4 of the present invention.

In this embodiment, step S40: determine whether to select a sleep mode of a mobile terminal device.

In this embodiment, whether to select the sleep mode of the mobile terminal device may be determined in a user manual selection manner or an automatic system selection manner. Separate descriptions are made below.

First case: when whether to select the sleep mode of the mobile terminal device is determined in a user manual selection manner, the following may be included.

When the mobile terminal device detects that a user presses a power key on the mobile terminal device manually for a pre-set time period expired, the mobile terminal device prompts whether the user selects to enter a sleep mode or enter a power-off mode through a selection box.

When the user selects the sleep mode, the mobile terminal device begins steps S42 and S44.

When the user selects the power-off mode, the mobile terminal device executes a normal power-off procedure, that is, it is powered off.

The mobile terminal device may provide an application for selecting sleep to be selected by the user manually, this application for selecting sleep may be displayed on a touch screen of the mobile terminal device, and when whether to select the sleep mode of the mobile terminal device is determined in the user manual selection manner, the following may be further included.

The mobile terminal device detects whether the user triggers the application for selecting sleep.

When the mobile terminal device detects that the user triggers the application for selecting sleep, the mobile terminal device begins steps S42 and S44.

When whether to select the sleep mode of the mobile terminal device is determined in the user manual selection manner, the following may be further included. The mobile terminal device provides a selection box for selecting to enter the sleep mode in a system setting interface, so as to be selected by the user.

When the mobile terminal device detects that a user presses a power key on the mobile terminal device manually for a pre-set time period expired, whether the selection box of the sleep mode in the system setting interface is selected is determined.

If it is determined that the selection box of the sleep mode in the system setting interface is selected, that is, it is determined that the user selects the sleep mode, the mobile terminal device begins steps S42 and S44.

If it is determined that the selection box of the sleep mode in the system setting interface is not selected, that is, it is determined that the user does not select the sleep mode, the mobile terminal device executes a normal power-off procedure, that is, it is powered off.

Alternatively, when it is determined that the selection box of the sleep mode in the system setting interface is not selected, the mobile terminal device may further prompt whether the user selects to enter the sleep mode or enter the power-off mode through a selection box.

Second case: when whether to select the sleep mode of the mobile terminal device is determined in an automatic system selection manner, the following may be included.

When the mobile terminal device detects that a user selects power-off, the mobile terminal device detects whether the mobile terminal device is currently in a charging state, or whether a high definition multimedia interface (High Definition Multimedia Interface, HDMI) is inserted with an HDMI line.

When the mobile terminal device detects that the mobile terminal device is currently in the charging state or the HDMI is inserted with the HDMI line, the mobile terminal device performs a normal power-off procedure.

When the mobile terminal device detects that the mobile terminal device is not in the charging state currently or the HDMI is not inserted with the HDMI line, the mobile terminal device automatically selects the sleep mode in place of power-off, and the mobile terminal device begins steps S42 and S44.

When a power interface and a USB interface on the mobile terminal device are different, and when whether to select the sleep mode of the mobile terminal device is determined in the automatic system selection manner, the following may be further included.

The mobile terminal device detects whether an event that the power interface is inserted with a power line occurs.

When the mobile terminal device detects that the event that the power interface is inserted with the power line occurs, the mobile terminal device automatically selects the sleep mode in place of power-off, and begins to execute steps S42 and S44.

Definitely, when the power interface and the USB interface on the mobile terminal device are the same, and when the mobile terminal device detects that the event that the USB interface is inserted with a USB line occurs, the mobile terminal device performs a normal power-off procedure.

Step S42: when determining to select the sleep mode of the mobile terminal device, display a sleep effect in a manner of an animation or a wait box on a display screen of the mobile terminal device, or prompt a sleep progress in a sound manner While step S42 is being executed, the following steps may be synchronously executed.

Step S44: when it is determined to select a sleep mode of a mobile terminal device, the mobile terminal device records service state information related to data connection. In this embodiment, the service related to the data connection includes GPS, WIFI, and Bluetooth. In this embodiment, when the mobile terminal device is normally used, the service may have a current use state, so when the mobile terminal device enters sleep, the mobile terminal device records information of a current use state of the service, and the recorded state information is to be subsequently used to wake the mobile terminal device.

Step S46: turn off the service that is related to the data connection and is in a turn-on state. In this embodiment, the turning off the service that is related to the data connection and is turned on includes turning on an offline mode and turning off GPS.

Step S48: kill or turn off a non-core process. In this embodiment, core processes include a core process, a phone process, a SYSTEM_UID process, and an android.process-.media process. In this embodiment, killing or turning off a non-core process refers to killing or turning off a process except the core processes.

Step S49: control a processor to enter a sleep mode. In this embodiment, when the processor is controlled to enter the sleep mode, the processor does not process communication and application services again. In this embodiment, the processor may be controlled to enter the sleep mode by setting the current running state of the processor to a sleep state.

In this embodiment, the processor may include multiple models of processors, such as a single-core processor, a dual-core processor, and a quad-core processor. In this embodiment, when the processor is a single-core processor, because a communication service and an application service are processed by one processor, the single-core processor is directly controlled to enter the sleep mode; when the processor is a dual-core processor, it is required to control a processor for processing a communication service and a processor for processing an application service to enter the sleep mode; when the processor is a quad-core processor, it is required to control a processor for processing a communication service and a processor for processing an application service to enter the sleep mode. The rest may be deduced by analogy. When the processor is a multi-core processor, it is required to control a processor for processing a communication service and a processor for processing an application service to enter the sleep mode.

After the processor enters the sleep mode, step S42 may end, so as to indicate that the mobile terminal device has entered the sleep mode currently.

In the sleep method provided in the embodiment of the present invention, by turning off the service that is related to the data connection and is turned on, and controlling the processor to enter the sleep mode, the service related to the data connection and the use of the processor may be turned off, and the power consumption of the mobile terminal device in a standby state may be reduced. Compared with the prior art, more services and apparatuses consuming energy are turned off, and the power consumption of the mobile terminal device is saved more than that in the prior art, so the use time of the mobile terminal device is prolonged more. Furthermore, on the basis of Embodiment 1, because the non-core process is killed or turned off, the energy consumption of the mobile terminal device may be further reduced.

In this embodiment, after the mobile terminal device is slept, if the user needs to enable the slept mobile terminal device again, the user needs to wake the mobile terminal device. When the user needs to use the mobile terminal device, the current mobile terminal device is waked through a user operation, and the current mobile terminal device may also be waked through an automatic system selection wake function of the mobile terminal device.

Corresponding to Embodiment 1, Embodiment 2, Embodiment 3, and Embodiment 4, descriptions are made separately below.

Figure 5:
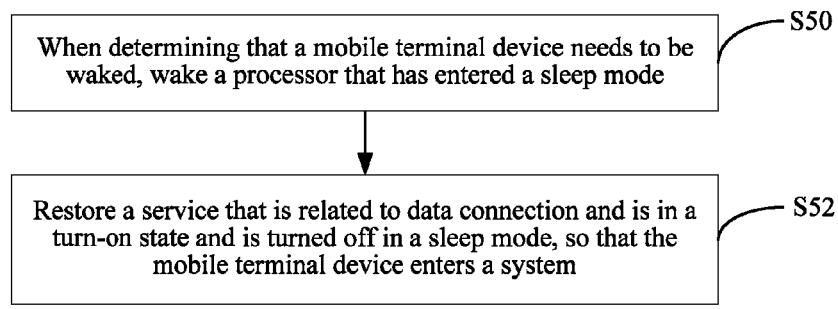
FIG. 5 is a flowchart of a wake method according to Embodiment 5 of the present invention.

FIG. 5 is a flowchart of a wake method according to Embodiment 5 of the present invention.

In this embodiment, corresponding to Embodiment 1, step S50: when determining that a mobile terminal device needs to be waked, wake a processor has entered a sleep mode.

In this embodiment, when the processor is a single-core processor, the application service of the processor may be waked first, and then the communication service of the processor is waked; or only the application service of the processor may be waked, and the communication service of the processor is not waked, or which is understood as follows, the application service of the processor is waked first, and then whether to wake the communication service of the processor is determined; or the application service and the communication service of the processor may be waked simultaneously.

In this embodiment, the procedure that the application service of the processor may be waked first, and then the communication service of the processor is waked; or only the application service of the processor may be waked, and the communication service of the processor is not waked may include:

after waking the application service of the processor, determining whether the current mobile terminal device is inserted with a SIM card and whether an offline mode is not turned on;

when determining that the current mobile terminal device is inserted with the SIM card and the offline mode is not turned on, waking the communication service of the processor;

when determining that the current mobile terminal device is inserted with the SIM card and the offline mode is turned on, or the mobile terminal device is not inserted with the SIM card and the offline mode is turned on, or the mobile terminal device is not inserted with the SIM card and the offline mode is not turned on, not waking the communication service of the processor.

When the processor is a dual-core processor, it is required to wake a processor for processing a communication service and a processor for processing an application service, where the processor for processing an application service may be waked first, and then the processor for processing a communication service is waked; or only the processor for processing an application service may be waked, and the processor for processing a communication service is not waked; or the processor for processing an application service and the processor for processing a communication service may be waked simultaneously.

When the processor is a quad-core processor, it is required to wake a processor for processing a communication service and a processor for processing an application service, where the processor for processing an application service may be waked first, and then the processor for processing a communication service is waked; or only the processor for processing an application service may be waked, and the processor for processing a communication service is not waked; or which is understood as follows, the processor for processing an application service is waked first, and then whether to wake the processor for processing a communication service is determined; or the processor for processing an application service and the processor for processing a communication service may be waked simultaneously.

The rest may be deduced by analogy. If the processor is a multi-core processor, it is required to wake a processor for processing a communication service and a processor for processing an application service.

In this embodiment, the procedure that a processor for processing an application service may be waked first, and then whether to wake a processor for processing a communication service is determined may include:

after waking the application service of the processor, determining whether the current mobile terminal device is inserted with a SIM card and whether an offline mode is not turned on;

when determining that the current mobile terminal device is inserted with the SIM card and the offline mode is not turned on, waking the communication service of the processor;

when determining that the current mobile terminal device is inserted with the SIM card and the offline mode is turned on, or the mobile terminal device is not inserted with the SIM card and the offline mode is turned on, or the mobile terminal device is not inserted with the SIM card and the offline mode is not turned on, not waking the communication service of the processor.

In this embodiment, the procedure of determining that a mobile terminal device needs to be waked may include:

detecting whether the power key of the current mobile terminal device is pressed, or detecting whether the power interface of the current mobile terminal device is inserted with a power line, or detecting whether the HDMI of the current mobile terminal device is inserted with an HDMI line, or detecting whether the SIM card of the current mobile terminal device is plugged or unplugged, which may also be understood as follows, detecting whether an event that a power key is pressed occurs, or whether an event that a power interface is inserted with a power line occurs, or whether an event that an HDMI is inserted with an HDMI line occurs, or whether an event that a SIM card is plugged or unplugged occurs in the current mobile terminal device;

if detecting that the power key of the current mobile terminal device is pressed, or detecting that the power interface of the current mobile terminal device is inserted with the power line, or detecting that the HDMI of the current mobile terminal device is inserted with the HDMI line, or detecting that the SIM card of the current mobile terminal device is plugged or unplugged, determining that the mobile terminal device needs to be waked, which may also be understood as follows, if detecting that the event that the power key is pressed occurs, or the event that the power interface is inserted with the power line occurs, or the event that the HDMI is inserted with the HDMI line occurs, or the event that the SIM card is plugged or unplugged occurs in the current mobile terminal device, determining that the mobile terminal device needs to be waked;

if detecting that the power key of the current mobile terminal device is not pressed, or detecting that the power interface of the current mobile terminal device is not inserted with the power line, or detecting that the HDMI of the current mobile terminal device is not inserted with the HDMI line, or detecting that the SIM card of the current mobile terminal device is not plugged or unplugged, determining that the mobile terminal device does not need to be waked, which may also be understood as follows, if detecting that the event that the power key is pressed does not occur, or the event that the power interface is inserted with the power line does not occur, or the event that the HDMI is inserted with the HDMI line does not occur, or the event that the SIM card is plugged or unplugged does not occur in the current mobile terminal device, determining that the mobile terminal device does not need to be waked.

Step S52: restore a service that is related to data connection and is in a turn-on state and is turned off in the sleep mode, so that the mobile terminal device enters a system. In this embodiment, the service related to the data connection includes GPS, WIFI, and Bluetooth. Before entering sleep, the mobile terminal device records current information of the turn-on state and the turn-off state of the service, and when entering sleep, the mobile terminal device needs to turn off the service that is related to the data connection and is in the turn-on state, so at the time of waking the mobile terminal device, the service that is related to the data connection and is in the turn-on state and is turned off in the sleep mode needs to be restored.

After the steps are executed, it may be considered that the mobile terminal device is waked, and the mobile terminal device enters the system and displays a boot screen.

In the wake method provided in the embodiment of the present invention, when it is determined that the mobile terminal device needs to be waked, by waking the processor that has entered a sleep mode and restoring the service that is related to the data connection and is in the turn-on state and is turned off in the sleep mode, the mobile terminal device is waked, and the mobile terminal device enters the system and displays a boot screen. Compared with the prior art in which a normal startup procedure makes a user wait for a very long time, it is not required to execute operations of initializing the system and loading each system program in the startup procedure in the prior art, and it is only required to wake the processor that has entered a sleep mode and restore the service that is related to the data connection and is in the turn-on state and is turned off in the sleep mode, the mobile terminal device can be quickly waked, and the mobile terminal device enters the system and displays a boot screen. In this way, the user does not need to select a power-off manner to save the power consumption of the mobile terminal device, and when a mobile phone is required, the user does not need to start up the mobile terminal device again to enable it to begin normal work, thereby greatly improving user experience.

In this embodiment, with the wake method provided in the embodiment of the present invention, the mobile terminal device may be quickly waked in the time of 2S.

In this embodiment, alternatively, on the basis of FIG. 5, an additional operation may be added optionally. For example, when it is determined that the mobile terminal device needs to be waked, a wake effect is displayed through an animation or a wait box on a display screen of the mobile terminal device, or a wake progress is prompted through a sound. Definitely, the operation may be performed together with other steps simultaneously. In this embodiment, if an additional operation may be added optionally on the basis of FIG. 5, the time for waking the mobile terminal device may be prolonged, but is still shorter than the startup time of the prior art. In this embodiment, an additional operation may be added optionally, and the mobile terminal device may be quickly waked in the time of 5S. Meanwhile, the wake effect of the current mobile terminal device may also be prompted for the user at any time, thereby improving user experience.

Alternatively, if killing or turning off a non-core process is executed in a sleep procedure, in a wake procedure, after the service that is related to the data connection and is in the turn-on state and is turned off in the sleep mode is restored, a starting complete message is sent to an application in the mobile terminal device, so as to implement that a service running in need of startup begins to run in a startup procedure. In this embodiment, if an additional operation may be added optionally on the basis of FIG. 5, the time for waking the mobile terminal device may be prolonged, but is still shorter than the startup time of the prior art. In this embodiment, an additional operation may be added optionally, and the mobile terminal device may be quickly waked in the time of 5S.

The wake method of Embodiment 1 in combination with the alternative operation is described below.

Figure 6:
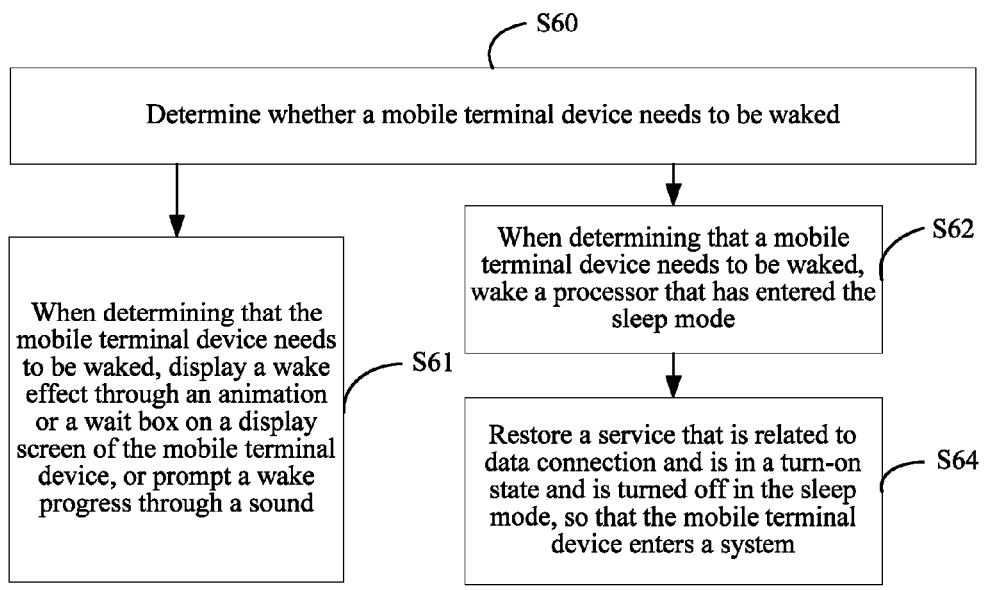
FIG. 6 is a flowchart of a wake method according to Embodiment 6 of the present invention.

FIG. 6 is a flowchart of a wake method according to Embodiment 6 of the present invention.

In this embodiment, corresponding to Embodiment 2, step S60: determine whether a mobile terminal device needs to be waked.

In this embodiment, the procedure of determining whether the mobile terminal device needs to be waked may include:

detecting whether a power key of the current mobile terminal device is pressed, or detecting whether a power interface of the current mobile terminal device is inserted with a power line, or detecting whether an HDMI of the current mobile terminal device is inserted with an HDMI line, or detecting whether a SIM card of the current mobile terminal device is plugged or unplugged; which may also be understood as follows, detecting whether an event that a power key is pressed occurs, or whether an event that a power interface is inserted with a power line occurs, or whether an event that an HDMI is inserted with an HDMI line occurs, or whether an event that a SIM card is plugged or unplugged occurs in the current mobile terminal device;

if detecting that the power key of the current mobile terminal device is pressed, or detecting that the power interface of the current mobile terminal device is inserted with the power line, or detecting that the HDMI of the current mobile terminal device is inserted with the HDMI line, or detecting that the SIM card of the current mobile terminal device is plugged or unplugged, determining that the mobile terminal device needs to be waked, and executing steps S61 and S62, which may also be understood as follows, if detecting that the event that the power key is pressed occurs, or the event that the power interface is inserted with the power line occurs, or the event that the HDMI is inserted with the HDMI line occurs, or the event that the SIM card is plugged or unplugged occurs in the current mobile terminal device, determining that the mobile terminal device needs to be waked, and executing steps S61 and S62;

if detecting that the power key of the current mobile terminal device is not pressed, or detecting that the power interface of the current mobile terminal device is not inserted with the power line, or detecting that the HDMI of the current mobile terminal device is not inserted with the HDMI line, or detecting that the SIM card of the current mobile terminal device is not plugged or unplugged, determining that the mobile terminal device does not need to be waked, which may also be understood as follows, if detecting that the event that the power key is pressed does not occur, or the event that the power interface is inserted with the power line does not occur, or the event that the HDMI is inserted with the HDMI line does not occur, or the event that the SIM card is plugged or unplugged does not occur in the current mobile terminal device, determining that the mobile terminal device does not need to be waked, where the mobile terminal device does not respond, that is, does not perform any operation.

Step S61: when determining that the mobile terminal device needs to be waked, display a wake effect through an animation or a wait box on a display screen of the mobile terminal device, or prompt a wake progress through a sound.

While step S61 is being executed, the following steps may be synchronously executed.

Step S62: when determining that a mobile terminal device needs to be waked, wake a processor that has entered a sleep mode.

Step S64: restore a service that is related to data connection and is in a turn-on state and is turned off in the sleep mode, so that the mobile terminal device enters a system. In this embodiment, the service related to the data connection includes GPS, WIFI, and Bluetooth. Before entering sleep, the mobile terminal device records current information of the turn-on state and the turn-off state of the service, and when entering sleep, the mobile terminal device needs to turn off the service that is related to the data connection and is in the turn-on state, so at the time of waking the mobile terminal device, the service that is related to the data connection and is in the turn-on state and is turned off in the sleep mode needs to be restored.

After the steps are executed, it may be considered that the mobile terminal device is waked, step S61 may end, and the mobile terminal device enters the system and displays a boot screen. In this embodiment, in the case of displaying the wake effect through an animation or a wait box on the display screen of the mobile terminal device or prompting the wake progress through a sound, the display time of the animation or wait box or the prompt time of the sound may be greater than or equal to the time used to execute steps S62 and S64.

In the wake method provided in the embodiment of the present invention, when it is determined that the mobile terminal device needs to be waked, by waking the processor that has entered a sleep mode and restoring the service that is related to the data connection and is in the turn-on state and is turned off in the sleep mode, the mobile terminal device is waked, and the mobile terminal device enters the system and displays a boot screen. Compared with the prior art in which a normal startup procedure makes a user wait for a very long time, it is not required to execute operations of initializing the system and loading each system program in the startup procedure in the prior art, and it is only required to wake the processor that has entered a sleep mode and restore the service that is related to the data connection and is in the turn-on state and is turned off in the sleep mode, the mobile terminal device can be quickly waked, and the mobile terminal device enters the system and displays a boot screen. In this way, the user does not need to select a power-off manner to save the power consumption of the mobile terminal device, and when a mobile phone is required, the user does not need to start up the mobile terminal device again to enable it to begin normal work, thereby greatly improving user experience.

Figure 7:
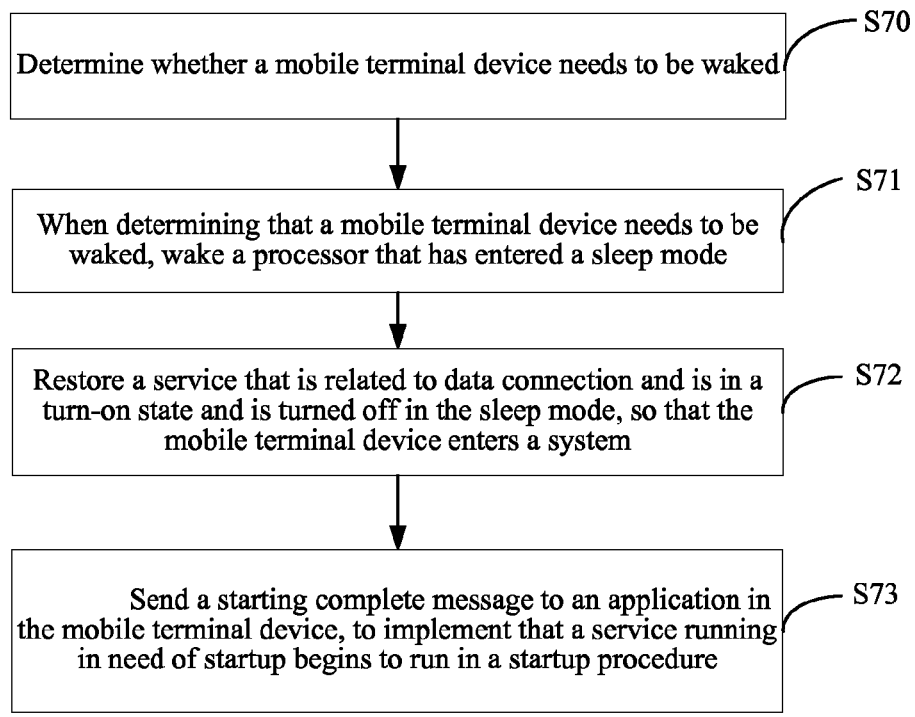
FIG. 7 is a flowchart of a wake method according to Embodiment 7 of the present invention.

FIG. 7 is a flowchart of a wake method according to Embodiment 7 of the present invention.

In this embodiment, corresponding to Embodiment 3, step S70: determine whether a mobile terminal device needs to be waked.

In this embodiment, the procedure of determining whether the mobile terminal device needs to be waked may include:

detecting whether a power key of the current mobile terminal device is pressed, or detecting whether a power interface of the current mobile terminal device is inserted with a power line, or detecting whether an HDMI of the current mobile terminal device is inserted with an HDMI line, or detecting whether a SIM card of the current mobile terminal device is plugged or unplugged; which may also be understood as follows, detecting whether an event that a power key is pressed occurs, or whether an event that a power interface is inserted with a power line occurs, or whether an event that an HDMI is inserted with an HDMI line occurs, or whether an event that a SIM card is plugged or unplugged occurs in the current mobile terminal device;

if detecting that the power key of the current mobile terminal device is pressed, or detecting that the power interface of the current mobile terminal device is inserted with the power line, or detecting that the HDMI of the current mobile terminal device is inserted with the HDMI line, or detecting that the SIM card of the current mobile terminal device is plugged or unplugged, determining that the mobile terminal device needs to be waked, and executing step S71, which may also be understood as follows, if detecting that the event that the power key is pressed occurs, or the event that the power interface is inserted with the power line occurs, or the event that the HDMI is inserted with the HDMI line occurs, or the event that the SIM card is plugged or unplugged occurs in the current mobile terminal device, determining that the mobile terminal device needs to be waked, and executing step S71;

if detecting that the power key of the current mobile terminal device is not pressed, or detecting that the power interface of the current mobile terminal device is not inserted with the power line, or detecting that the HDMI of the current mobile terminal device is not inserted with the HDMI line, or detecting that the SIM card of the current mobile terminal device is not plugged or unplugged, determining that the mobile terminal device does not need to be waked, which may also be understood as follows, if detecting that the event that the power key is pressed does not occur, or the event that the power interface is inserted with the power line does not occur, or the event that the HDMI is inserted with the HDMI line does not occur, or the event that the SIM card is plugged or unplugged does not occur in the current mobile terminal device, determining that the mobile terminal device does not need to be waked, where the mobile terminal device does not respond, that is, does not perform any operation.

Step S71: when determining that a mobile terminal device needs to be waked, wake a processor that has entered a sleep mode.

Step S72: restore a service that is related to data connection and is in a turn-on state and is turned off in the sleep mode, so that the mobile terminal device enters a system. In this embodiment, the service related to the data connection includes GPS, WIFI, and Bluetooth. Before entering sleep, the mobile terminal device records current information of the turn-on state and the turn-off state of the service, and when entering sleep, the mobile terminal device needs to turn off the service that is related to the data connection and is in the turn-on state, so at the time of waking the mobile terminal device, the service that is related to the data connection and is in the turn-on state and is turned off in the sleep mode needs to be restored.

Step S73: send a starting complete message to an application in the mobile terminal device, so as to implement that a service running in need of startup begins to run in a startup procedure.

After the steps are executed, it may be considered that the mobile terminal device is waked, and the mobile terminal device enters the system and displays a boot screen.

In the wake method provided in the embodiment of the present invention, when it is determined that the mobile terminal device needs to be waked, by waking the processor that has entered a sleep mode and restoring the service that is related to the data connection and is in the turn-on state and is turned off in the sleep mode, the mobile terminal device is waked, and the mobile terminal device enters the system and displays a boot screen. Compared with the prior art in which a normal startup procedure makes a user wait for a very long time, it is not required to execute operations of initializing the system and loading each system program in the startup procedure in the prior art, and it is only required to wake the processor that has entered a sleep mode and restore the service that is related to the data connection and is in the turn-on state and is turned off in the sleep mode, the mobile terminal device can be quickly waked, and the mobile terminal device enters the system and displays a boot screen. In this way, the user does not need to select a power-off manner to save the power consumption of the mobile terminal device, and when a mobile phone is required, the user does not need to start up the mobile terminal device again to enable it to begin normal work, thereby greatly improving user experience.

Figure 8:
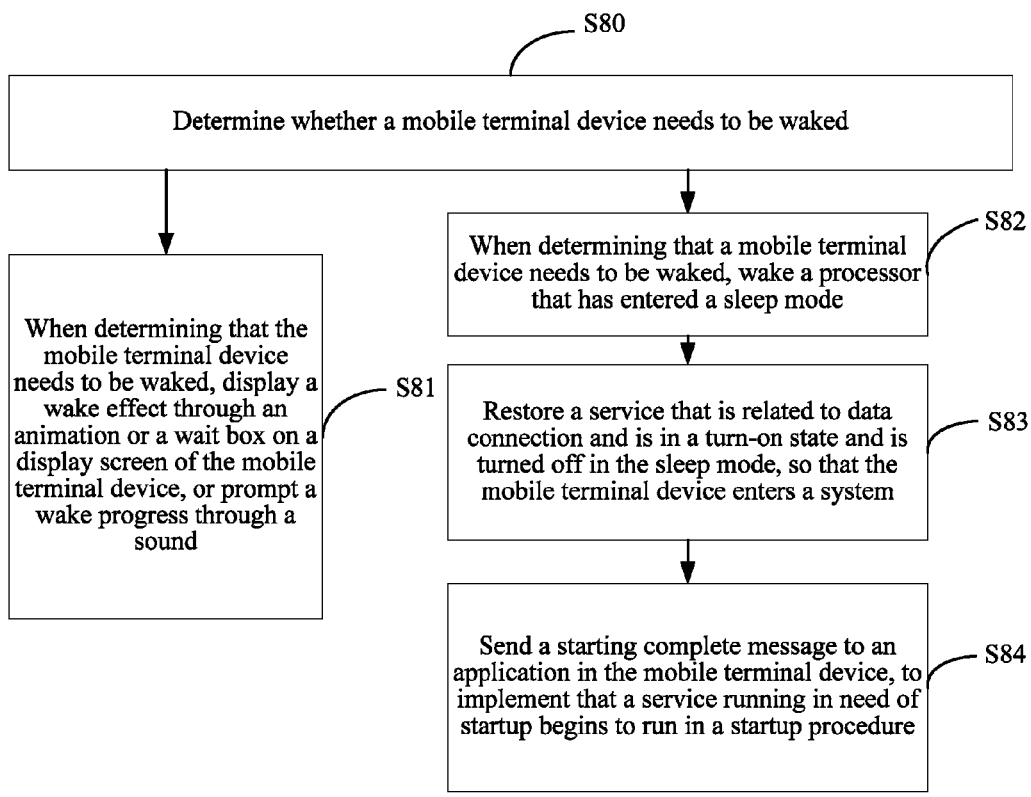
FIG. 8 is a flowchart of a wake method according to Embodiment 8 of the present invention.

FIG. 8 is a flowchart of a wake method according to Embodiment 8 of the present invention.

In this embodiment, corresponding to Embodiment 4, step S80: determine whether a mobile terminal device needs to be waked.

In this embodiment, the procedure of determining whether the mobile terminal device needs to be waked may include:

detecting whether a power key of the current mobile terminal device is pressed, or detecting whether a power interface of the current mobile terminal device is inserted with a power line, or detecting whether an HDMI of the current mobile terminal device is inserted with an HDMI line, or detecting whether a SIM card of the current mobile terminal device is plugged or unplugged; which may also be understood as follows, detecting whether an event that a power key is pressed occurs, or whether an event that a power interface is inserted with a power line occurs, or whether an event that an HDMI is inserted with an HDMI line occurs, or whether an event that a SIM card is plugged or unplugged occurs in the current mobile terminal device;

if detecting that the power key of the current mobile terminal device is pressed, or detecting that the power interface of the current mobile terminal device is inserted with the power line, or detecting that the HDMI of the current mobile terminal device is inserted with the HDMI line, or detecting that the SIM card of the current mobile terminal device is plugged or unplugged, determining that the mobile terminal device needs to be waked, and executing steps S81 and S82, which may also be understood as follows, if detecting that the event that the power key is pressed occurs, or the event that the power interface is inserted with the power line occurs, or the event that the HDMI is inserted with the HDMI line occurs, or the event that the SIM card is plugged or unplugged occurs in the current mobile terminal device, determining that the mobile terminal device needs to be waked, and executing steps S81 and S82;

if detecting that the power key of the current mobile terminal device is not pressed, or detecting that the power interface of the current mobile terminal device is not inserted with the power line, or detecting that the HDMI of the current mobile terminal device is not inserted with the HDMI line, or detecting that the SIM card of the current mobile terminal device is not plugged or unplugged, determining that the mobile terminal device does not need to be waked, which may also be understood as follows, if detecting that the event that the power key is pressed does not occur, or the event that the power interface is inserted with the power line does not occur, or the event that the HDMI is inserted with the HDMI line does not occur, or the event that the SIM card is plugged or unplugged does not occur in the current mobile terminal device, determining that the mobile terminal device does not need to be waked, where the mobile terminal device does not respond, that is, does not perform any operation.

Step S81: when determining that the mobile terminal device needs to be waked, display a wake effect through an animation or a wait box on a display screen of the mobile terminal device, or prompt a wake progress through a sound. In this embodiment, the step S81 and the following steps may be executed simultaneously.

Step S82: when determining that a mobile terminal device needs to be waked, wake a processor that has entered a sleep mode.

Step S83: restore a service that is related to data connection and is in a turn-on state and is turned off in the sleep mode, so that the mobile terminal device enters a system. In this embodiment, the service related to the data connection includes GPS, WIFI, and Bluetooth. Before entering sleep, the mobile terminal device records current information of the turn-on state and the turn-off state of the service, and when entering sleep, the mobile terminal device needs to turn off the service that is related to the data connection and is in the turn-on state, so at the time of waking the mobile terminal device, the service that is related to the data connection and is in the turn-on state and is turned off in the sleep mode needs to be restored.

Step S84: send a starting complete message to an application in the mobile terminal device, so as to implement that a service running in need of startup begins to run in a startup procedure.

After the steps are executed, it may be considered that the mobile terminal device is waked, step S81 may end, and the mobile terminal device enters the system and displays a boot screen.

In the wake method provided in the embodiment of the present invention, when it is determined that the mobile terminal device needs to be waked, by waking the processor that has entered a sleep mode and restoring the service that is related to the data connection and is in the turn-on state and is turned off in the sleep mode, the mobile terminal device is waked, and the mobile terminal device enters the system and displays a boot screen. Compared with the prior art in which a normal startup procedure makes a user wait for a very long time, it is not required to execute operations of initializing the system and loading each system program in the startup procedure in the prior art, and it is only required to wake the processor that has entered a sleep mode and restore the service that is related to the data connection and is in the turn-on state and is turned off in the sleep mode, the mobile terminal device can be quickly waked, and the mobile terminal device enters the system and displays a boot screen. In this way, the user does not need to select a power-off manner to save the power consumption of the mobile terminal device, and when a mobile phone is required, the user does not need to start up the mobile terminal device again to enable it to begin normal work, thereby greatly improving user experience.

Figure 9:
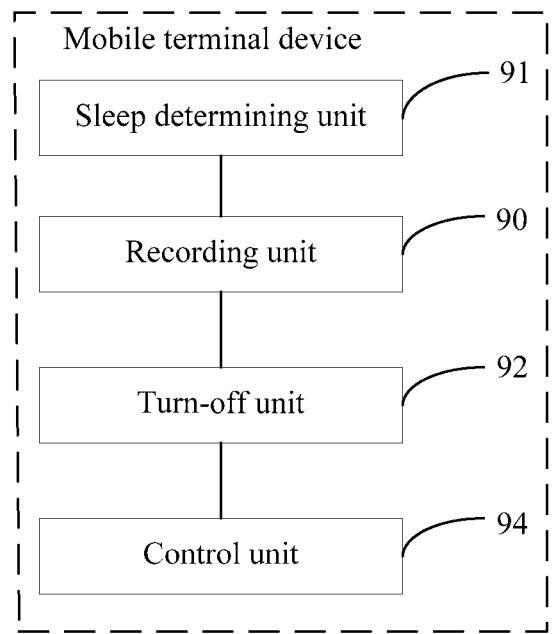
FIG. 9 is a structural diagram of a mobile terminal device according to Embodiment 1 of the present invention.

Accordingly, FIG. 9 is a structural diagram of a mobile terminal device according to Embodiment 1 of the present invention.

In this embodiment, a recording unit 90, a turn-off unit 92, and a control unit 94 are provided.

The recording unit 90 is configured to, when it is determined to select a sleep mode of a mobile terminal device, record service state information related to data connection. In this embodiment, a service related to the data connection includes GPS, WIFI, and Bluetooth. In this embodiment, when the mobile terminal device is normally used, the service may have a current use state, so when the mobile terminal device enters sleep, the mobile terminal device records current information of a turn-on state and a turn-off state of the service, and the recorded state information is to be subsequently used to wake the mobile terminal device.

The turn-off unit 92 is configured to, according to the service state information related to the data connection recorded by the recording unit 90, turn off the service that is related to the data connection and is in a turn-on state. In this embodiment, turning off the service that is related to the data connection and is turned on includes turning on an offline mode and turning off GPS.

The control unit 94 is configured to, after the turn-off unit 92 turns off the service that is related to the data connection and is in the turn-on state, control a processor to enter a sleep mode. In this embodiment, when the processor is controlled to enter the sleep mode, the processor does not process communication and application services again. In this embodiment, the processor may be controlled to enter the sleep mode by setting the current running state of the processor to a sleep state.

In this embodiment, the processor may include multiple models of processors, such as a single-core processor, a dual-core processor, and a quad-core processor. In this embodiment, when the processor is a single-core processor, because a communication service and an application service are processed by one processor, the single-core processor is directly controlled to enter the sleep mode; when the processor is a dual-core processor, it is required to control a processor for processing a communication service and a processor for processing an application service to enter the sleep mode; when the processor is a quad-core processor, it is required to control a processor for processing a communication service and a processor for processing an application service to enter the sleep mode. The rest may be deduced by analogy. When the processor is a multi-core processor, it is required to control a processor for processing a communication service and a processor for processing an application service to enter the sleep mode.

In this embodiment, after the application service of the processor enters the sleep mode, the mobile terminal device turns off its screen, that is, it indicates that the mobile terminal device has entered the sleep mode.

In this embodiment, the mobile terminal device may further include a sleep determining unit 91, where the sleep determining unit 91 is configured to determine whether to select the sleep mode of the mobile terminal device. In this embodiment, the sleep determining unit 91 determines whether to select the sleep mode of the mobile terminal device in a user manual selection manner or an automatic system selection manner. Separate descriptions are made below.

First case: when whether to select the sleep mode of the mobile terminal device is determined in a user manual selection manner, the following may be included.

When the sleep determining unit 91 detects that a user presses a power key on the mobile terminal device manually for a pre-set time period expired, the sleep determining unit 91 prompts whether the user selects to enter a sleep mode or enter a power-off mode through a selection box.

When the user selects the sleep mode, the recording unit 90 begins to record the service state information related to data connection, that is, the recording unit 90 is configured to, when the sleep determining unit 91 determines to select the sleep mode of the mobile terminal device, record the service state information related to data connection.

When the user selects the power-off mode, the mobile terminal device executes a normal power-off procedure, that is, it is powered off, and in this case, the mobile terminal device may further include a power-off module (not shown), configured to execute a normal power-off procedure.

The mobile terminal device may provide an application for selecting sleep to be selected by the user manually, this application for selecting sleep may be displayed on a touch screen of the mobile terminal device, and when whether to select the sleep mode of the mobile terminal device is determined in the user manual selection manner, the sleep determining unit 91 detects whether the user triggers the application for selecting sleep. When the sleep determining unit 91 detects that the user triggers the application for selecting sleep, the sleep determining unit 91 determines that the user selects the sleep mode, and the recording unit 90 begins to record the service state information related to data connection. That is, the recording unit 90 is configured to, when the sleep determining unit 91 determines to select the sleep mode of the mobile terminal device, record the service state information related to data connection.

When whether to select the sleep mode of the mobile terminal device is determined in the user manual selection manner, the following may be further included. The mobile terminal device provides a selection box for selecting to enter the sleep mode in a system setting interface, so as to be selected by the user.

When detecting that the user presses the power key on the mobile terminal device manually for a pre-set time period expired, the sleep determining unit 91 determines whether a selection box of the sleep mode in the system setting interface is selected.

If it is determined that the selection box of the sleep mode in the system setting interface is selected, that is, the sleep determining unit 91 determines that the user selects the sleep mode, the recording unit 90 begins to record the service state information related to data connection. That is, the recording unit 90 is configured to, when the sleep determining unit 91 determines to select the sleep mode of the mobile terminal device, record the service state information related to data connection.

If it is determined that the selection box of the sleep mode in the system setting interface is not selected, that is, it is determined that the user does not select the sleep mode, the mobile terminal device executes a normal power-off procedure, that is, it is powered off.

Alternatively, when it is determined that the selection box of the sleep mode in the system setting interface is not selected, the sleep determining unit 91 may further prompt whether the user selects to enter the sleep mode or enter the power-off mode through a selection box.

Second case: when whether to select the sleep mode of the mobile terminal device is determined in an automatic system selection manner, the following may be included.

When the sleep determining unit 91 detects that a user selects power-off, the sleep determining unit 91 detects whether the mobile terminal device is currently in a charging state, or whether a high definition multimedia interface (High Definition Multimedia Interface, HDMI) is inserted with an HDMI line.

When the sleep determining unit 91 detects that the mobile terminal device is currently in the charging state or the HDMI is inserted with the HDMI line, the sleep determining unit 91 determines to perform a normal power-off procedure.

When the sleep determining unit 91 detects that the mobile terminal device is not in the charging state currently or the HDMI is not inserted with the HDMI line, the sleep determining unit 91 automatically selects the sleep mode in place of power-off, and the recording unit 90 begins to record the service state information related to data connection. That is, the recording unit 90 is configured to, when the sleep determining unit 91 determines to select the sleep mode of the mobile terminal device, record the service state information related to data connection.

When a power interface and a USB interface on the mobile terminal device are different, and when whether to select the sleep mode of the mobile terminal device is determined in the automatic system selection manner, the sleep determining unit 91 is further configured to detect whether an event that the power interface is inserted with a power line occurs. When detecting that the event that the power interface is inserted with the power line occurs, the sleep determining unit 91 automatically selects the sleep mode in place of power-off.

Definitely, when the power interface and the USB interface on the mobile terminal device are the same, and when the sleep determining unit 91 detects that an event that the USB interface is inserted with a USB line occurs, the sleep determining unit 91 determines to perform a normal power-off procedure.

In the mobile terminal device provided in the embodiment of the present invention, by turning off the service that is related to the data connection and is turned on, and controlling the processor to enter the sleep mode, the service related to the data connection and the use of the processor may be turned off, and the power consumption of the mobile terminal device in a standby state may be reduced. Compared with the prior art, more services and apparatuses consuming energy are turned off, and the power consumption of the mobile terminal device is saved more than that in the prior art, so the use time of the mobile terminal device is prolonged more, and a user does not need to select a power-off manner to save the power consumption of the mobile terminal device.

Figure 10:
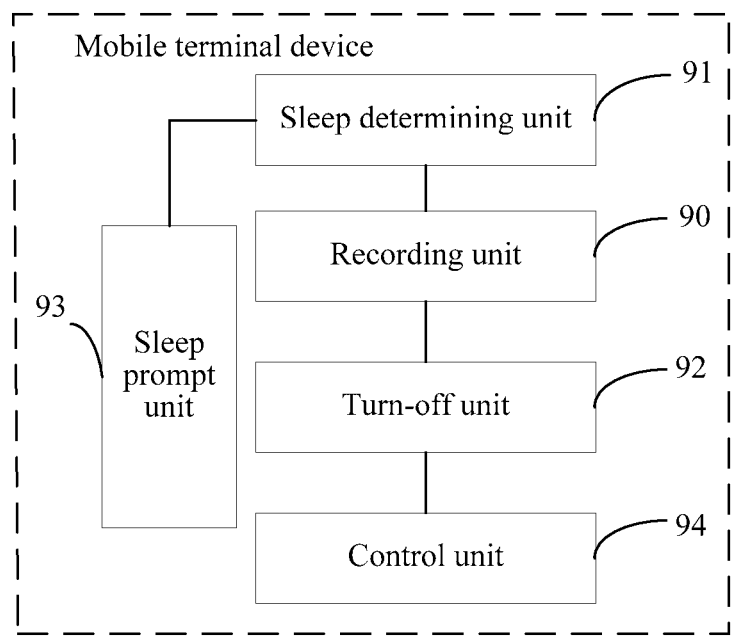
FIG. 10 is a structural diagram of a mobile terminal device according to Embodiment 2 of the present invention.

FIG. 10 is a structural diagram of a mobile terminal device according to Embodiment 2 of the present invention.

In this embodiment, on the basis of FIG. 9, alternatively, the mobile terminal device may further include a sleep prompt unit 93 which is configured to, when it is determined to select the sleep mode of the mobile terminal device, display a sleep effect through an animation or a wait box on a display screen of the mobile terminal device, or prompt a sleep progress through a sound.

In this embodiment, the sleep prompt unit 93 is further configured to, when the sleep determining unit 91 determines to select the sleep mode of the mobile terminal device, display a sleep effect through an animation or a wait box on a display screen of the mobile terminal device, or prompt a sleep progress through a sound.

In this embodiment, the user is prompted in a manner that a sleep effect is displayed through an animation or a wait box on a display screen of the mobile terminal device, or a sleep progress is prompted through a sound, to achieve improvement of user experience.

Figure 11:
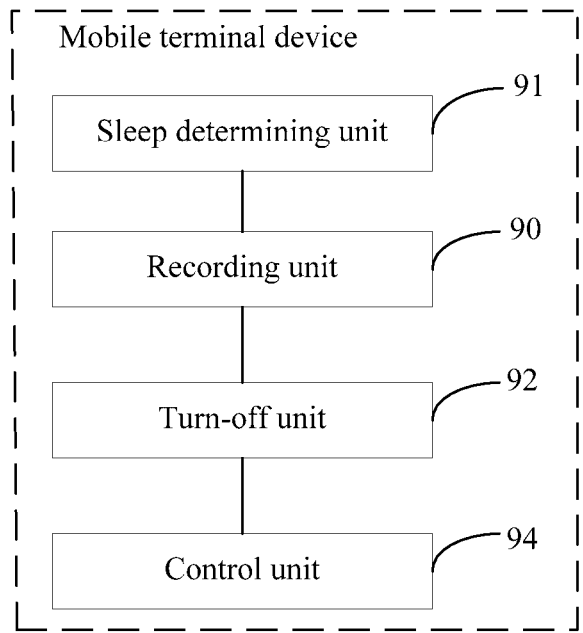
FIG. 11 is a structural diagram of a mobile terminal device according to Embodiment 3 of the present invention.

FIG. 11 is a structural diagram of a mobile terminal device according to Embodiment 3 of the present invention.

In this embodiment, on the basis of FIG. 9, alternatively, the turn-off unit 92 may be further configured to, after turning off the service that is related to the data connection and is in a turn-on state, kill or turn off a non-core process. In this embodiment, core processes include a core process, a phone process, a SYSTEM_UID process, and an android.process.media process. In this embodiment, killing or turning off a non-core process refers to killing or turning off a process except the core processes.

On the basis of Embodiment 1, because the non-core process is killed or turned off, the energy consumption of the mobile terminal device may be further reduced.

Figure 12:
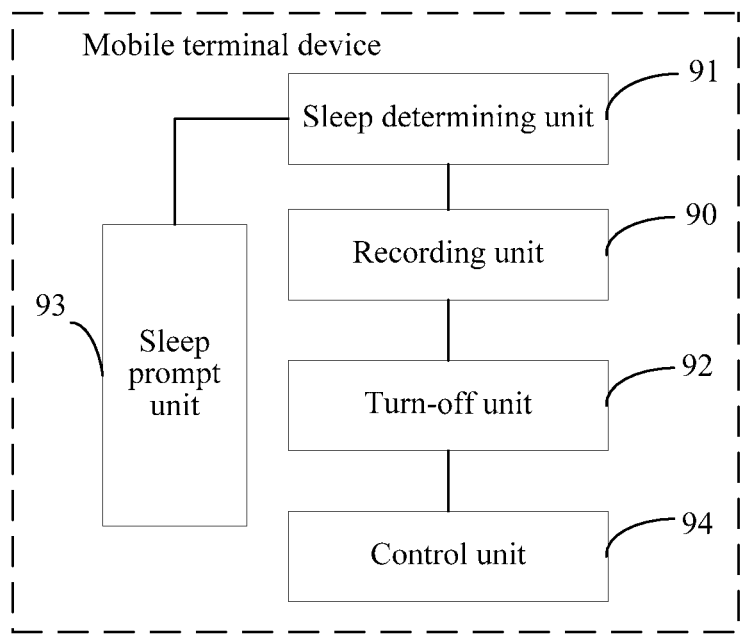
FIG. 12 is a structural diagram of a mobile terminal device according to Embodiment 4 of the present invention.

FIG. 12 is a structural diagram of a mobile terminal device according to Embodiment 4 of the present invention.

In this embodiment, on the basis of FIG. 9, alternatively, in combination with FIG. 10 and FIG. 11, the mobile terminal device may include the sleep prompt unit 93 and the turn-off unit 92 simultaneously, where the turn-off unit 92 is configured to, after turning off the service that is related to the data connection and is in the turn-on state, kill or turn off a non-core process; the sleep prompt unit 93 is configured to, when the sleep determining unit 91 determines to select the sleep mode of the mobile terminal device, display a sleep effect through an animation or a wait box on a display screen of the mobile terminal device, or prompt a sleep progress through a sound.

In this embodiment, after the mobile terminal device is slept, if the user needs to enable the slept mobile terminal device again, the user needs to wake the mobile terminal device. When the user needs to use the mobile terminal device, the current mobile terminal device is waked through a user operation, and the current mobile terminal device may also be waked through an automatic system selection wake function of the mobile terminal device.

Corresponding to Embodiment 5, Embodiment 6, Embodiment 7, and Embodiment 8, descriptions are made separately below.

Figure 13:
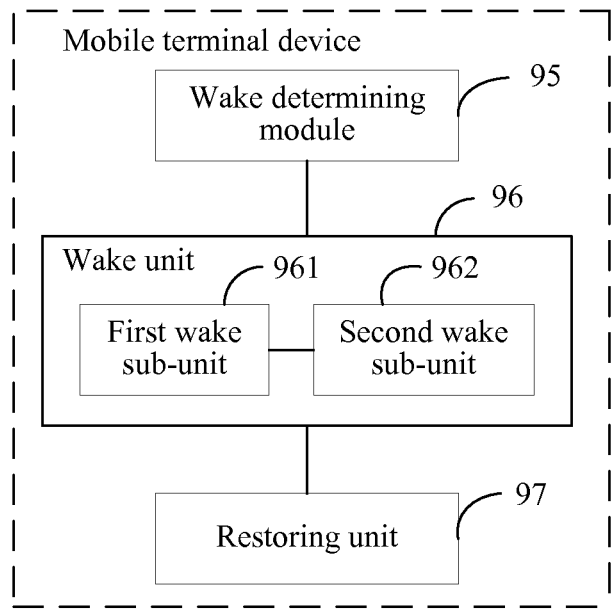
FIG. 13 is a structural diagram of a mobile terminal device according to Embodiment 5 of the present invention.

FIG. 13 is a structural diagram of a mobile terminal device according to Embodiment 5 of the present invention.

In this embodiment, corresponding to Embodiment 5, the mobile terminal device includes a wake unit 96 and a restoring unit 97. The wake unit 96 is configured to, when it is determined that the mobile terminal device needs to be waked, wake a processor that has entered a sleep mode. In this embodiment, when the processor is a single-core processor, the application service of the processor may be waked first, and then the communication service of the processor is waked; or only the application service of the processor may be waked, and the communication service of the processor is not waked, or which may be understood as follows, the application service of the processor is waked first, and then whether to wake the communication service of the processor is determined; or the application service and the communication service of the processor may be waked simultaneously.

In this embodiment, when the application service of the processor may be waked first, and then whether to wake the communication service of the processor is determined, the wake unit 96 includes: a first wake sub-unit 961 and a second wake sub-unit 962.

The first wake sub-unit 961 is configured to wake the application service of the processor. The second wake sub-unit 962 is configured to, after the application service of the processor is waked, determine whether the current mobile terminal device is inserted with a SIM card and whether an offline mode is not turned on. In this embodiment, the second wake sub-unit 962 is further configured to, when determining that the current mobile terminal device is inserted with the SIM card and the offline mode is not turned on, wake the communication service of the processor, or when determining that the current mobile terminal device is inserted with the SIM card and the offline mode is turned on, or the mobile terminal device is not inserted with the SIM card and the offline mode is turned on, or the mobile terminal device is not inserted with the SIM card and the offline mode is not turned on, not wake the communication service of the processor.

When the processor is a dual-core processor, it is required to wake a processor for processing a communication service and a processor for processing an application service, where the processor for processing an application service may be waked first, and then the processor for processing a communication service is waked; or only the processor for processing an application service may be waked, and the processor for processing a communication service is not waked, or which may be understood as follows, the processor for processing an application service is waked first, and then whether to wake the processor for processing a communication service is determined; or the processor for processing an application service and the processor for processing a communication service may be waked simultaneously.

When the processor is a quad-core processor, it is required to wake a processor for processing a communication service and a processor for processing an application service, where the processor for processing an application service may be waked first, and then the processor for processing a communication service is waked; or only the processor for processing an application service may be waked, and the processor for processing a communication service is not waked, or which may be understood as follows, the processor for processing an application service is waked first, and then whether to wake the processor for processing a communication service is determined; or the processor for processing an application service and the processor for processing a communication service may be waked simultaneously.

The rest may be deduced by analogy. If the processor is a multi-core processor, it is required to wake a processor for processing a communication service and a processor for processing an application service.

In this embodiment, when the application service of the processor may be waked first, and then whether to wake the communication service of the processor is determined, the wake unit 96 includes: a first wake sub-unit 961 and a second wake sub-unit 962.

The first wake sub-unit 961 is configured to wake a processor for processing an application service. The second wake sub-unit 962 is configured to, after the processor for processing an application service is waked, determine whether the current mobile terminal device is inserted with a SIM card and whether an offline mode is not turned on. In this embodiment, the second wake sub-unit 962 is further configured to, when determining that the current mobile terminal device is inserted with the SIM card and the offline mode is not turned on, wake a processor for processing a communication service, or when determining that the current mobile terminal device is inserted with the SIM card and the offline mode is turned on, or the mobile terminal device is not inserted with the SIM card and the offline mode is turned on, or the mobile terminal device is not inserted with the SIM card and the offline mode is not turned on, not wake the processor for processing a communication service.

The restoring unit 97 is configured to restore a service that is related to data connection and is in a turn-on state and is turned off in the sleep mode. In this embodiment, the service related to the data connection includes GPS, WIFI, and Bluetooth. Before entering sleep, the mobile terminal device records current information of the turn-on state and the turn-off state of the service, and when entering sleep, the mobile terminal device needs to turn off the service that is related to the data connection and is in the turn-on state, so at the time of waking the mobile terminal device, the service that is related to the data connection and is in the turn-on state and is turned off in the sleep mode needs to be restored.

In this embodiment, through the execution operations of the wake unit 96 and the restoring unit 97, it may be considered that the mobile terminal device is waked, and the mobile terminal device enters a system and displays a boot screen.

In this embodiment, the mobile terminal device may further include a wake determining module 95, configured to determine whether the mobile terminal device needs to be waked.

In this embodiment, the determining module 95 is further configured to determine whether the mobile terminal device needs to be waked, by detecting whether a power key of the current mobile terminal device is pressed, or detecting whether a power interface of the current mobile terminal device is inserted with a power line, or detecting whether an HDMI of the current mobile terminal device is inserted with an HDMI line, or detecting whether a SIM card of the current mobile terminal device is plugged or unplugged, which may also be understood as, determine whether the mobile terminal device needs to be waked, by detecting whether an event that a power key is pressed occurs, or whether an event that a power interface is inserted with a power line occurs, or whether an event that an HDMI is inserted with an HDMI line occurs, or whether an event that a SIM card is plugged or unplugged occurs in the current mobile terminal device.

The wake determining module 95 is further configured to, if detecting that the power key of the current mobile terminal device is pressed, or detecting that the power interface of the current mobile terminal device is inserted with the power line, or detecting that the HDMI of the current mobile terminal device is inserted with the HDMI line, or detecting that the SIM card of the current mobile terminal device is plugged or unplugged, determine that the mobile terminal device needs to be waked, which may also be understood as follows, if detecting that the event that the power key is pressed occurs, or the event that the power interface is inserted with the power line occurs, or the event that the HDMI is inserted with the HDMI line occurs, or the event that the SIM card is plugged or unplugged occurs in the current mobile terminal device, determine that the mobile terminal device needs to be waked.

The wake determining module 95 is further configured to, if detecting that the power key of the current mobile terminal device is not pressed, or detecting that the power interface of the current mobile terminal device is not inserted with the power line, or detecting that the HDMI of the current mobile terminal device is not inserted with the HDMI line, or detecting that the SIM card of the current mobile terminal device is not plugged or unplugged, determine that the mobile terminal device does not need to be waked, which may also be understood as follows, if detecting that the event that the power key is pressed does not occur, or the event that the power interface is inserted with the power line does not occur, or the event that the HDMI is inserted with the HDMI line does not occur, or the event that the SIM card is plugged or unplugged does not occur in the current mobile terminal device, determine that the mobile terminal device does not need to be waked.

In the mobile terminal device provided in the embodiment of the present invention, when it is determined that the mobile terminal device needs to be waked, by waking the processor that has entered a sleep mode and restoring the service that is related to the data connection and is in the turn-on state and is turned off in the sleep mode, the mobile terminal device is waked, and the mobile terminal device enters the system and displays a boot screen. Compared with the prior art in which a normal startup procedure makes a user wait for a very long time, it is not required to execute operations of initializing the system and loading each system program in the startup procedure in the prior art, and it is only required to wake the processor that has entered a sleep mode and restore the service that is related to the data connection and is in the turn-on state and is turned off in the sleep mode, the mobile terminal device can be quickly waked, and the mobile terminal device enters the system and displays a boot screen. In this way, the user does not need to select a power-off manner to save the power consumption of the mobile terminal device, and when a mobile phone is required, the user does not need to start up the mobile terminal device again to enable it to begin normal work, thereby greatly improving user experience.

In this embodiment, with the mobile terminal device provided in the embodiment of the present invention, the mobile terminal device may be quickly waked in the time of 2S.

Figure 14:
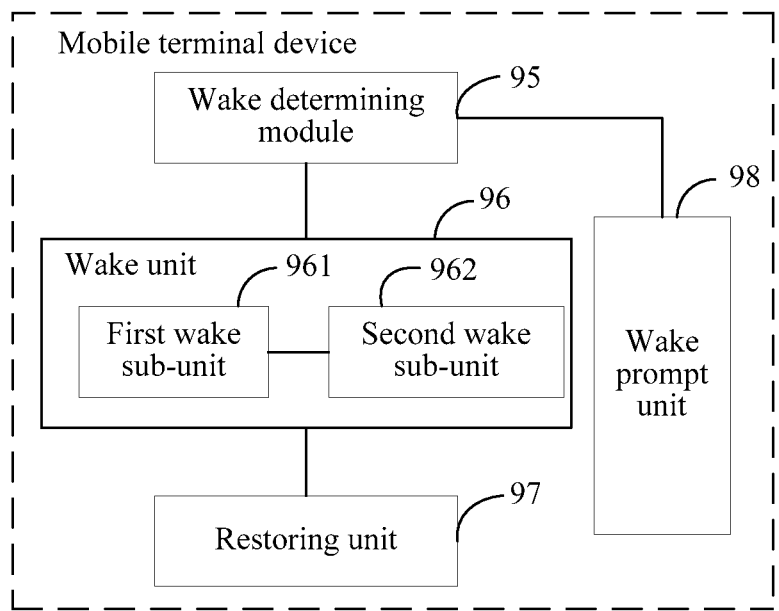
FIG. 14 is a structural diagram of a mobile terminal device according to Embodiment 6 of the present invention.

FIG. 14 is a structural diagram of a mobile terminal device according to Embodiment 6 of the present invention.

In this embodiment, corresponding to Embodiment 6, alternatively, on the basis of FIG. 13, the mobile terminal device may further include a wake prompt unit 98, configured to, when the wake determining module 95 determines that the mobile terminal device needs to be waked, display a wake effect through an animation or a wait box on a display screen of the mobile terminal device, or prompt a wake progress through a sound.

In this embodiment, the user is prompted in a manner that a wake effect is displayed through an animation or a wait box on a display screen of the mobile terminal device, or a wake progress is prompted through a sound, to achieve improvement of user experience.

In this embodiment, if an additional operation may be added optionally on the basis of FIG. 13, the time for waking the mobile terminal device may be prolonged, but is still shorter than the startup time of the prior art. In this embodiment, an additional operation may be added optionally, and the mobile terminal device may be quickly waked in the time of 5S.

Figure 15:
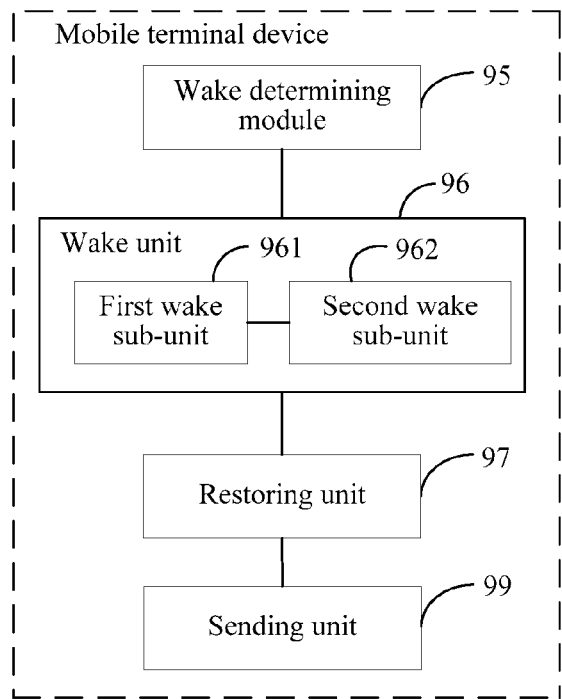
FIG. 15 is a structural diagram of a mobile terminal device according to Embodiment 7 of the present invention.

FIG. 15 is a structural diagram of a mobile terminal device according to Embodiment 7 of the present invention.

In this embodiment, corresponding to Embodiment 7, killing or turning off a non-core process is executed in a sleep procedure, so in a wake procedure, after the service that is related to the data connection and is in the turn-on state and is turned off in the sleep mode is restored, a starting complete message needs to be sent to an application in the mobile terminal device, so as to implement that a service running in need of startup begins to run in a startup procedure. Alternatively, on the basis of FIG. 13, the mobile terminal device may further include a sending unit 99, configured to, after the service that is related to the data connection and is in the turn-on state and is turned off in the sleep mode is restored, send a starting complete message to an application in the mobile terminal device, so as to implement that a service running in need of startup begins to run in a startup procedure.

In this embodiment, if an additional operation may be added optionally on the basis of FIG. 13, the time for waking the mobile terminal device may be prolonged, but is still shorter than the startup time of the prior art. In this embodiment, an additional operation may be added optionally, and the mobile terminal device may be quickly waked in the time of 5S.

Figure 16:
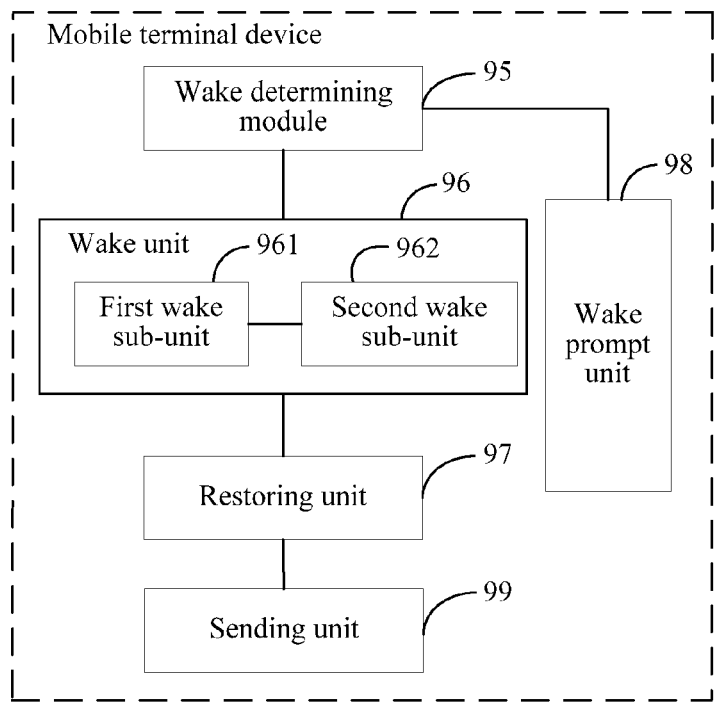
FIG. 16 is a structural diagram of a mobile terminal device according to Embodiment 8 of the present invention.

FIG. 16 is a structural diagram of a mobile terminal device according to Embodiment 8 of the present invention.

In this embodiment, corresponding to Embodiment 8, alternatively, on the basis of FIG. 13, the mobile terminal device may further include a wake prompt unit 98 and a sending unit 99. The sending unit 99 is configured to, after the service that is related to the data connection and is in the turn-on state and is turned off in the sleep mode is restored, send a starting complete message to an application in the mobile terminal device, so as to implement that a service running in need of startup begins to run in a startup procedure. The wake prompt unit 98 is configured to, when the wake determining module 95 determines that the mobile terminal device needs to be waked, display a wake effect through an animation or a wait box on a display screen of the mobile terminal device, or prompt a wake progress through a sound.

The sequence numbers of the preceding embodiments of the present invention are merely for the purpose of description but do not indicate the preference of the embodiments.

Persons of ordinary skill in the art should understand that all or a part of the processes of the methods in the embodiments may be implemented by a computer program instructing relevant hardware. The program may be stored in a computer readable storage medium. When the program runs, the process of each method embodiment is performed. The storage medium may be a magnetic disk, an optical disk, a Read-Only Memory (Read-Only Memory, ROM), a Random Access Memory (Read-Only Memory, RAM), and the like.

Finally, it should be noted that the foregoing embodiments are merely provided for describing the technical solutions of the present invention, but not intended to limit the present invention. It should be understood by persons of ordinary skill in the art that although the present invention has been described in detail with reference to the exemplary embodiments, modifications or equivalent replacements can be made to the technical solutions of the present invention, and such modifications or equivalent replacements cannot make the modified technical solutions depart from the idea and scope of the technical solutions of the present invention.

What is claimed is:

1. A sleep method, comprising:
   when determining to select a sleep mode of a mobile terminal device, recording, by the mobile terminal device, service state information related to data connection;
   according to the recorded service state information related to the data connection, turning off a service that is related to the data connection and is in a turn-on state; and
   controlling a processor to enter the sleep mode;
   wherein determining to select the sleep mode of the mobile terminal device in an automatic system selection manner comprises:
   (a) when the mobile terminal device detects that a user selects power-off, detecting, by the mobile terminal device, (1) whether the mobile terminal device is currently in a charging state, and (2) whether a high definition multimedia interface (HDMI) is inserted with an HDMI line, and when the mobile terminal device detects at least one from the group consisting of (i) the mobile terminal device is not in the charging state currently, and (ii) the HDMI is not inserted with the HDMI line, determining to select the sleep mode of the mobile terminal device; and (b) wherein when a power interface and a Universal Serial Bus (USB) interface on the mobile terminal device are different, determining to select the sleep mode of the mobile terminal device in the automatic system selection manner further comprises:

detecting, by the mobile terminal device, whether an event that the power interface is inserted with the power line occurs;

when the mobile terminal device detects that the event that the power interface is inserted with the power line occurs, determining to select the sleep mode of the mobile terminal device.

2. The method according to claim 1, wherein determining to select a sleep mode of a mobile terminal device comprises:

determining to select the sleep mode of the mobile terminal device in a user manual selection manner or an automatic system selection manner.

3. The method according to claim 2, wherein determining to select the sleep mode of the mobile terminal device in the user manual selection manner comprises at least one from the group consisting of:

(a) when the mobile terminal device detects that a user presses a power key on the mobile terminal device for a pre-set time period expired, prompting, by the mobile terminal device, whether the user selects to enter the sleep mode through a selection box; and when it is detected that the user selects the sleep mode, determining to select the sleep mode of the mobile terminal device;

(b) wherein determining to select the sleep mode of the mobile terminal device in the user manual selection manner further comprises:

detecting whether the user triggers an application for selecting sleep provided by the mobile terminal device;

when the mobile terminal device detects that the user triggers the application for selecting sleep, determining to select the sleep mode of the mobile terminal device; and (c) wherein determining to select the sleep mode of the mobile terminal device in the user manual selection manner further comprises:

when the mobile terminal device detects that the user presses the power key on the mobile terminal device manually for a pre-set time period expired, determining whether the selection box of the sleep mode in a system setting interface is selected;

if determining that the selection box of the sleep mode in the system setting interface is selected, determining to select the sleep mode of the mobile terminal device.

4. The method according to claim 1, wherein the service related to the data connection comprises GPS, WIFI, and Bluetooth, and the service state information comprises current information of the turn-on state and a turn-off state.

5. The method according to claim 1, wherein when the processor is a single-core processor, controlling the processor to enter the sleep mode comprises at least one from the group consisting of:

(a) controlling the single-core processor to enter the sleep mode; and (b) wherein when the processor is a multi-core processor, controlling the processor to enter the sleep mode comprises:

controlling a processor for processing a communication service and a processor for processing an application service to enter the sleep mode.

6. The method according to claim 1, further comprising:

after turning off the service that is related to the data connection and is in the turn-on state, turning off a non-core process, and wherein the non-core process refers to another process except a core process, a phone process, a SYSTEM_UID process, and an android.process.media process.

7. A wake method, comprising:

when determining that a mobile terminal device needs to be waked, waking a processor that has entered a sleep mode; and restoring a service that is related to data connection and is in a turn-on state and is turned off in the sleep mode, so that the mobile terminal device enters a system;

wherein determining that the mobile terminal device needs to be waked comprises:

detecting (a) whether an event that a power interface is inserted with a power line occurs, (b) whether an event that a high definition multimedia interface (HDMI) is inserted with an HDMI line occurs, and (c) whether an event that a Subscriber Identification Module (SIM) card is plugged or unplugged occurs in the current mobile terminal device; and when detecting at least one from the group consisting of (i) the event that the power interface is inserted with the power line occurs, (ii) the event that the HDMI is inserted with the HDMI line occurs, and (iii) the event that the SIM card is plugged or unplugged occurs in the current mobile terminal device, determining that the mobile terminal device needs to be waked.

8. The method according to claim 7, wherein when the processor is a single-core processor, waking the processor that has entered the sleep mode comprises:

first waking an application service of the processor, and then determining whether to wake a communication service of the processor; and wherein first waking the application service of the processor, and then determining whether to wake the communication service of the processor comprises:

after waking the application service of the processor, determining whether the current mobile terminal device is inserted with a SIM card and whether an offline mode is not turned on;

when determining that the current mobile terminal device is inserted with the SIM card and the offline mode is not turned on, waking the communication service of the processor; and when determining that the current mobile terminal device is inserted with the SIM card and the offline mode is turned on, or the current mobile terminal device is not inserted with the SIM card and the offline mode is turned on, or the current mobile terminal device is not inserted with the SIM card and the offline mode is not turned on, not waking the communication service of the processor.

9. The method according to claim 7, wherein when the processor is a single-core processor, waking the processor that has entered the sleep mode further comprises at least one from the group consisting of:

(a) waking an application service and a communication service of the processor simultaneously;

(b) wherein when the processor is a multi-core processor, waking the processor that has entered a sleep mode further comprises:

first waking a processor for processing an application service, and then determining whether to wake a processor for processing the communication service;
(c) wherein when the processor is a multi-core processor, waking the processor that has entered the sleep mode further comprises:
waking a processor for processing the communication service and a processor for processing the application service simultaneously.

10. The method according to claim 9, wherein first waking the processor for processing the application service, and then determining whether to wake the processor for processing the communication service comprises:
after waking the processor for processing the application service, determining whether the current mobile terminal device is inserted with the SIM card and whether the offline mode is not turned on;
when determining that the current mobile terminal device is inserted with the SIM card and the offline mode is not turned on, waking the processor for processing the communication service; and
when determining that the current mobile terminal device is inserted with the SIM card and the offline mode is turned on, or the current mobile terminal device is not inserted with the SIM card and the offline mode is turned on, or the current mobile terminal device is not inserted with the SIM card and the offline mode is not turned on, not waking the processor for processing the communication service.

11. A mobile terminal device applied to sleep, comprising:
a recording unit, configured to, when it is determined to select a sleep mode of the mobile terminal device, record service state information related to data connection;
a turn-off unit, configured to, according to the recorded service state information related to the data connection, turn off a service that is related to the data connection and is in a turn-on state; and
a control unit, configured to control a processor to enter a sleep mode;
a sleep determining unit, configured to determine to select the sleep mode of the mobile terminal device, comprising:
(I) when detecting that a user selects power-off detecting (a) whether the mobile terminal device is currently in a charging state, and (b) whether a high definition multimedia interface (HDMI) is inserted with an HDMI line, and when detecting at least one from the group consisting of (i) the mobile terminal device is not in the charging state currently, and (ii) the HDMI is not inserted with the HDMI line, determining to select the sleep mode of the mobile terminal device; and
(II) when a power interface and a Universal Serial Bus (USB) interface on the mobile terminal device are different, detecting whether an event that the power interface is inserted with a power line occurs, and when the mobile terminal device detects that the event that the power interface is inserted with the power line occurs, determining to select the sleep mode of the mobile terminal device.

12. The mobile terminal device according to claim 11, further comprising:
the sleep determining unit, configured to determine to select the sleep mode of the mobile terminal device, is further configured to determine to select the sleep mode of the mobile terminal device in a user manual selection manner or an automatic system selection manner.

13. The mobile terminal device according to claim 11, wherein the sleep determining unit is further configured to, when it is detected that a user presses a power key on the mobile terminal device for a pre-set time period expired, prompt whether the user selects to enter the sleep mode through a selection box, and when it is detected that the user selects the sleep mode, determine to select the sleep mode of the mobile terminal device.

14. The mobile terminal device according to claim 11, wherein
the turn-off unit is further configured to, after turning off the service that is related to the data connection and is in the turn-on state, turn off a non-core process.

15. The mobile terminal device according to claim 11, wherein the control unit is further configured to, when the processor is a single-core processor, control the single-core processor to enter the sleep mode, or further configured to, when the processor is a multi-core processor, control a processor for processing a communication service and a processor for processing an application service to enter the sleep mode.

16. The mobile terminal device according to claim 11, wherein the sleep determining unit is further configured to, when it is detected that a user presses the power key on the mobile terminal device for a pre-set time period expired, determine whether the selection box of the sleep mode in a system setting interface is selected, and when determining that the selection box of the sleep mode in the system setting interface is selected, determine that the user selects the sleep mode.

17. The mobile terminal device according to claim 11, wherein the sleep determining unit is further configured to detect whether a user triggers an application for selecting sleep provided by the mobile terminal device, and when the mobile terminal device detects that the user triggers the application for selecting the sleep mode, determine to select the sleep mode of the mobile terminal device.

18. A mobile terminal device applied to wake, comprising:
a wake unit, configured to, when it is determined that the mobile terminal device needs to be waked, wake a processor that has entered a sleep mode; and a restoring unit, configured to restore a service that is related to data connection and is in a turn-on state and is turned off in the sleep mode, so that the mobile terminal device enters a system;
wherein the mobile terminal device further comprises: a wake determining module, configured to determine whether the mobile terminal device needs to be waked;
wherein the wake determining module is further configured to determine whether the mobile terminal device needs to be waked, by detecting (a) whether an event that a power interface is inserted with a power line occurs, (b) whether an event that a high definition multimedia interface (HDMI) is inserted with an HDMI line occurs, and (c) whether an event that a Subscriber Identification Module (SIM) card is plugged or unplugged occurs in the current mobile terminal device; and
wherein the wake determining module is further configured to determine that the mobile terminal device needs to be waked, when at least one is detected from the group consisting of (i) the event that the power interface is inserted with the power line occurs, (ii) the event that the HDMI is inserted with the HDMI line occurs, and (iii) the event that the SIM card is plugged or unplugged occurs in the current mobile terminal device.

19. The mobile terminal device according to claim 18, wherein when the processor is a single-core processor, the wake unit is further configured to first wake an application service of the processor, and then determine whether to wake a communication service of the processor, and wherein the wake unit comprises: a first wake sub-unit and a second wake sub-unit, wherein the first wake sub-unit is configured to wake the application service of the processor; and the second wake sub-unit is configured to, after the application service of the processor is waked, determine whether the current mobile terminal device is inserted with a SIM card and whether an offline mode is turned on.

20. The mobile terminal device according to claim 19, wherein the second wake sub-unit is further configured to, when determining that the current mobile terminal device is inserted with the SIM card and the offline mode is not turned on, wake the communication service of the processor; and wherein the second wake sub-unit is further configured to, when determining that the current mobile terminal device is inserted with the SIM card and the offline mode is turned on, or the current mobile terminal device is not inserted with the SIM card and the offline mode is turned on, or the current mobile terminal device is not inserted with the SIM card and the offline mode is not turned on, not wake the communication service of the processor.

21. The mobile terminal device according to claim 19, wherein when the processor is a single-core processor, the wake unit is further configured to wake an application service and a communication service of the processor simultaneously; and wherein when the processor is a multi-core processor, the wake unit is further configured to first wake a processor for processing an application service, and then determine whether to wake a processor for processing a communication service.

22. The mobile terminal device according to claim 21, wherein when the processor is a multi-core processor, and wherein the wake unit comprises: a first wake sub-unit and a second wake sub-unit, wherein the first wake sub-unit is configured to wake the processor for processing an application service;

the second wake sub-unit is configured to, after the processor for processing an application service is waked, determine whether the current mobile terminal device is inserted with the SIM card and whether the offline mode is not turned on;

wherein the second wake sub-unit is further configured to, when determining that the current mobile terminal device is inserted with the SIM card and the offline mode is not turned on, wake the processor for processing a communication service; and wherein the second wake sub-unit is further configured to, when determining that the current mobile terminal device is inserted with the SIM card and the offline mode is turned on, or the current mobile terminal device is not inserted with the SIM card and the offline mode is turned on, or the current mobile terminal device is not inserted with the SIM card and the offline mode is not turned on, not wake the processor for processing the communication service.

23. The mobile terminal device according to claim 21, wherein when the processor is a multi-core processor, the wake unit is further configured to wake a processor for processing an application service and a processor for processing a communication service simultaneously.

* * * * *

UNITED STATES PATENT AND TRADEMARK OFFICE
CERTIFICATE OF CORRECTION

| | |
|---|---|
| PATENT NO. | : 8,543,164 B2 |
| APPLICATION NO. | : 13/622677 |
| DATED | : September 24, 2013 |
| INVENTOR(S) | : Miao He |

It is certified that error appears in the above-identified patent and that said Letters Patent is hereby corrected as shown below:

On the Title Page, Item (71), Applicant city/country should read -- Shenzhen (CN) --.

Signed and Sealed this
Twenty-sixth Day of November, 2013

Margaret A. Focarino
*Commissioner for Patents of the United States Patent and Trademark Office*